United States Patent [19]
Banno et al.

[11] Patent Number: 5,202,992
[45] Date of Patent: Apr. 13, 1993

[54] ZOOM LENS APPARATUS

[75] Inventors: Makoto Banno; Nobuyuki Adachi; Hiroshi Miyamae; Kiichirou Ueda, all of Tokyo, Japan

[73] Assignee: Konica Corporation, Tokyo, Japan

[21] Appl. No.: 689,559

[22] Filed: Apr. 23, 1991

[30] Foreign Application Priority Data

Apr. 27, 1990 [JP] Japan .............................. 110504/1990
May 7, 1990 [JP] Japan .............................. 115842/1990
May 7, 1990 [JP] Japan .............................. 115843/1990
Jul. 23, 1990 [JP] Japan .............................. 192932/1990

[51] Int. Cl.$^5$ .......................... G02B 15/14; G02B 9/60
[52] U.S. Cl. ..................................... 359/676; 359/684; 359/764
[58] Field of Search ................. 359/642, 728, 672–677, 359/679–693, 744, 745, 746, 749, 753, 754, 763–770, , 642, 708, 728

[56] References Cited

U.S. PATENT DOCUMENTS

| | | | |
|---|---|---|---|
| 4,802,747 | 2/1989 | Horiuchi | 359/687 |
| 4,818,083 | 4/1989 | Mihara | 359/687 |
| 4,859,042 | 8/1989 | Tanaka | 359/687 |
| 5,061,051 | 10/1991 | Miyamae | 359/676 |
| 5,100,223 | 3/1992 | Ono et al. | 359/676 |

FOREIGN PATENT DOCUMENTS

| | | |
|---|---|---|
| 52-15226 | 11/1974 | Japan . |
| 62-24213 | 2/1987 | Japan . |
| 63-123009 | 5/1988 | Japan . |
| 285510 | 11/1988 | Japan ................................. 359/677 |
| 292306 | 11/1989 | Japan ................................. 359/677 |
| 50120 | 2/1990 | Japan ................................. 359/677 |

*Primary Examiner*—Bruce Y. Arnold
*Assistant Examiner*—Thong Nguyen
*Attorney, Agent, or Firm*—Finnegan, Henderson, Farabow, Garrett & Dunner

[57] ABSTRACT

In a zoom lens apparatus having a lens component which is movable for variation of image magnification, a lens component to compensate for the shift of focus caused by the variation of the image magnification and which is movable to bring an object to be photographed into focus, and a device for driving and positioning each of the lens components, there is provided a controller to control the device. The controller has a position table for each of the lens components and a memory to store the actual positions of the lens components. The controller compares each of the actual positions of the lens components stored in the memory with the position table, based on a signal for a desired magnification so that the zoom lens can focus on a predetermined image plane.

9 Claims, 30 Drawing Sheets

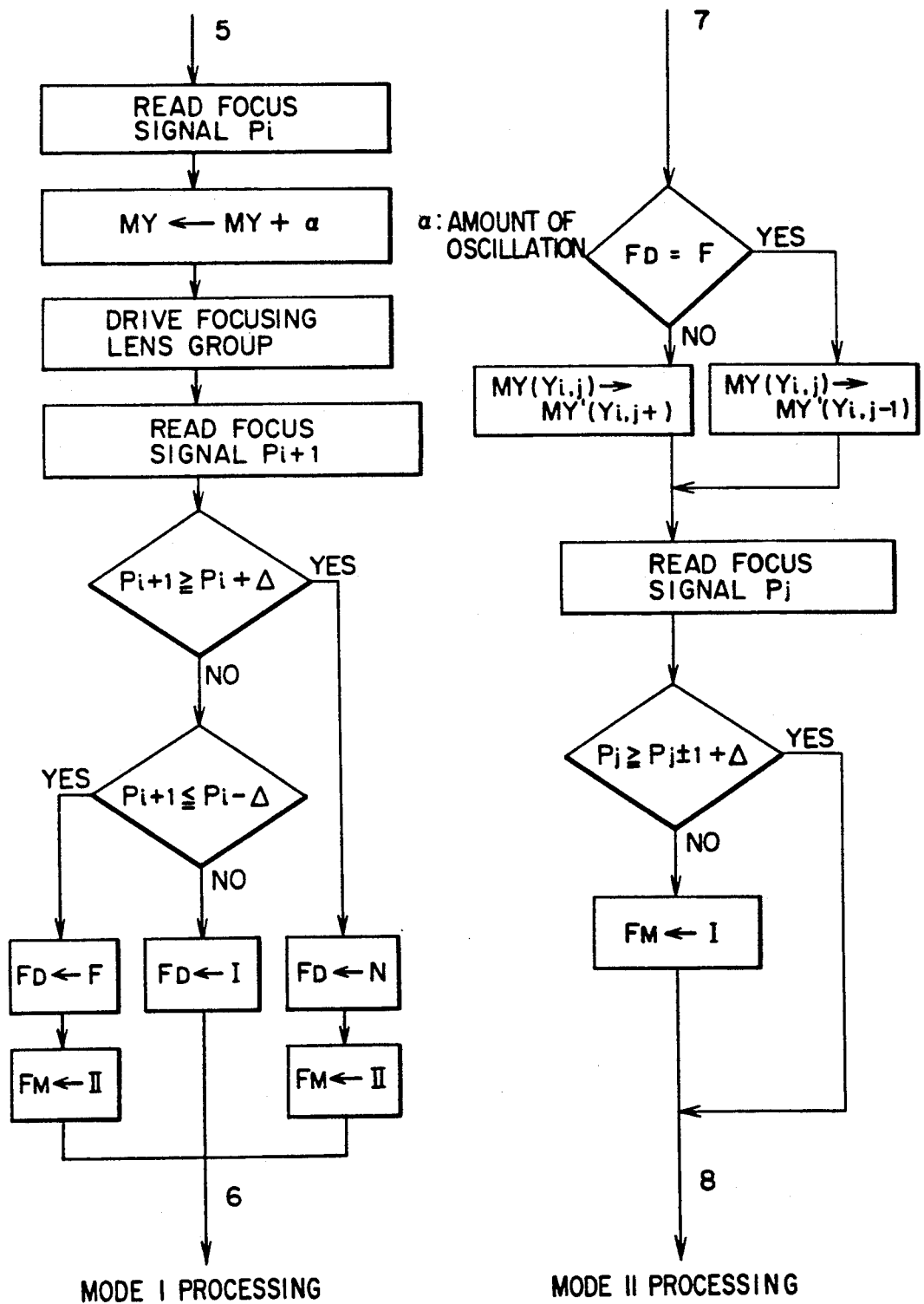

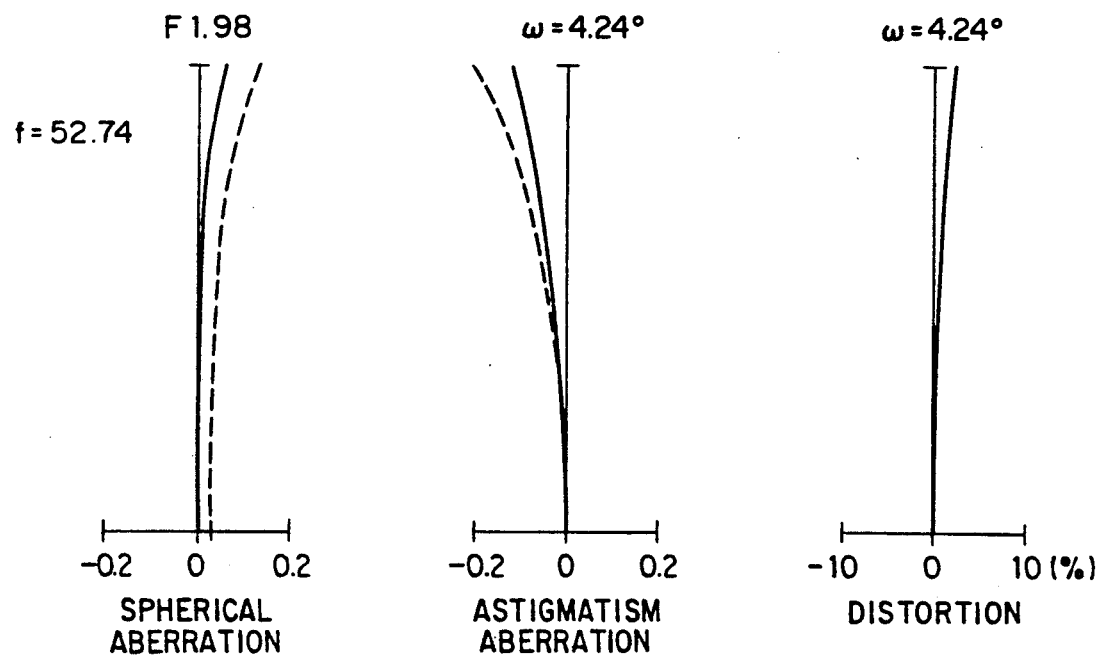

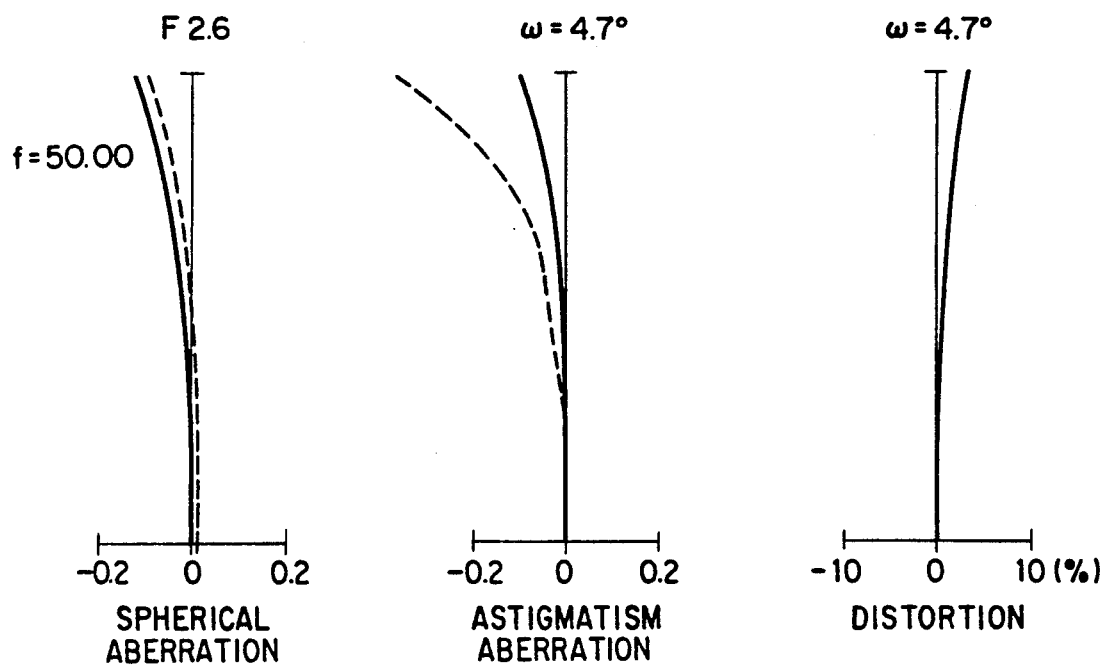
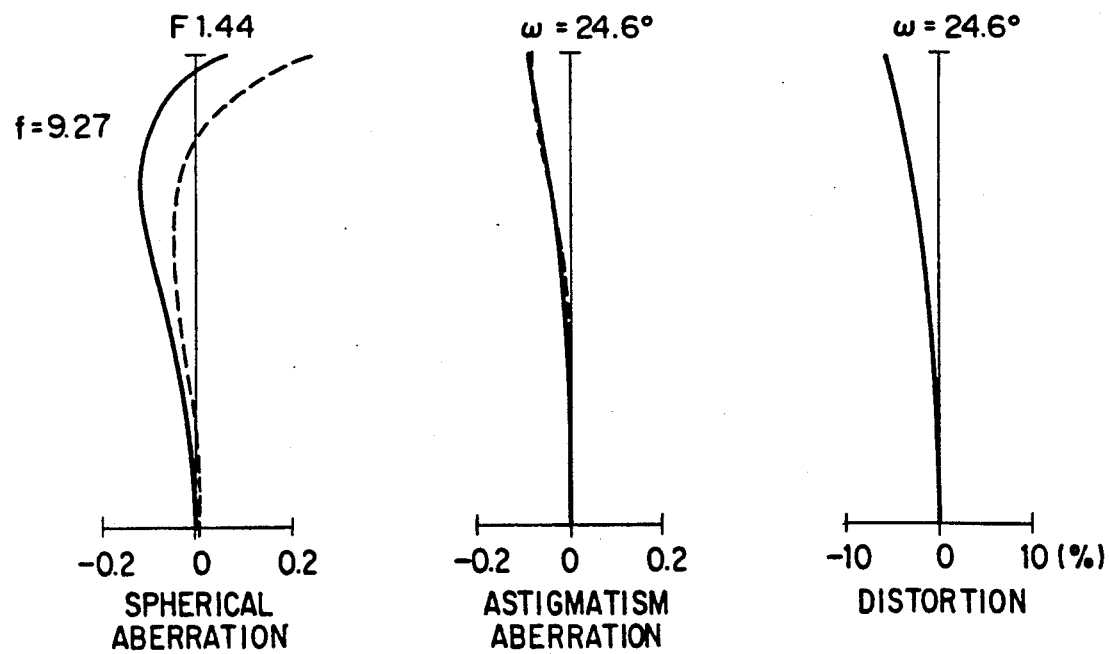

ZOOM LENS APPARATUS

BACKGROUND OF THE INVENTION

The present invention relates to a zoom lens apparatus particularly for actively controlling the lens position for variation of the image magnification and focusing.

The present invention furthermore relates to compact zoom lenses with high speed and with a high variable magnification ratio which are particularly suited to video cameras.

Recently, a control method is also used in zoom lenses such as that in place of lens position control by a cam, in which the lens group position is operated according to the detected value of each lens position detecting means, free of restrictions such as defects caused by the shape of the cam groove.

For example, a zoom focusing method is indicated in Japanese Patent Application Publication No. 52-15226, wherein a first detection means for detecting the set focal length of the variable magnification lens system and a second detection means for detecting the focus condition of the lens are installed and the lens group position is determined and controlled by operations according to the detected values of the first and second detection means so as to keep the focus point within the depth of focus.

However, the above prior art causes problems such as those below when detected values are changed as time elapses.

(1) When the detected value is changed faster than the response speed of the lens group position setting means, it is difficult to catch up with the change of focus and to compensate it by controlling operation.

(2) A position setting means which can follow expected high speed changes in the detected value is large in scale and expensive, and cannot be mounted to amateurs' cameras.

Furthermore, zoom lenses with high speed and with a high variable magnification ratio suited to video cameras are indicated in Japanese Patent Application Laid-Open Nos. 62-24213 and 63-123009, wherein four lens components with refractive powers of positive, negative, positive, and positive are mounted sequentially from the object side, the first and third lens components are fixed during variation of the image magnification, the second component is moved in one direction so as to perform the variation of the image magnification, and the fourth lens component is moved back and forth so as to compensate variations in the focal point caused by the variation of the image magnification.

In zoom lenses by this method, the movement distance of the fourth lens component for correcting the image surface position due to the magnification ratio is comparatively large, and when the entire system is scaled down so as to make the lens system compact, variations in the aberration caused by the variation of the image magnification cannot be fully corrected.

Furthermore, in zoom lenses by this method, it is well known that the number of lenses is comparatively small though each lens has a high magnification ratio and a large aperture ratio, and the distance between the first lens and the diaphragm can be shortened because the third lens component does not move during zooming. Therefore, the diameter of the front lens can be made comparatively small. However, if the lens system is made more compact and the magnification ratio is increased, the performance is inevitably degraded. Particularly, the distortion and astigmatism aberration are increased.

SUMMARY OF THE INVENTION

The first object of the present invention is to provide a compact, highly reliable, and inexpensive zoom apparatus by the active control means of the lens groups which receives the zooming intention or the focus adjustment intention of the user via its command receiving means, and which sets the positions of the lens groups by picking up the proper combination of the positioning values from the table of the lens group position sets corresponding to the zoom positions and the object distances which are pre-stored in the memory means of the active control means, so that the present invention can avoid the failure of the synchronous control of the lens groups which could occur on account of the time delay between the actual movement of the lens groups and its detection signals, when the prior art of passive control method which uses position detection means of the lens groups is applied to this purpose.

The second object of the present invention is to provide zoom lenses suited to video cameras, wherein the variable magnification ratio is about 6, the F-number ranges from 1.4 to 2.0, the number of lenses constituting the lens system is small, and the overall length and the diameter of the front lens are small.

A zoom lens apparatus for accomplishing the first object of the present invention is configured so that in zoom lenses include a lens group for moving for variation of the image magnification, a lens group for moving for compensating a focal point variation caused by the variation of the image magnification and for focusing, and a means for driving and positioning the lens groups; and a calculation control means for controlling each drive means which contains a position table for the lens groups and has a memory for storing the lens group positions, wherein the above position table and the memory are compared by a signal from a variable magnification instruction means for instructing variable magnification to the calculation control means, and the image focal point can be kept within a depth of focus by controlling the lens positions.

The above zoom lens apparatus further comprises a focal status detection means for driving and controlling the focusing lens group so as to provide a best focusing status, a focal point adjustment instruction means, and a switching means for selecting the automatic focusing or powered focusing mode, which stops the automatic focusing control mode when the powered focusing mode is selected and drives and controls the focusing lens group according to a signal from the focus adjustment instruction means. The above zoom lens apparatus is inexpensively structured so that each lens group can be controlled by a stepping drive means such as a stepping motor unless a position detection means is provided for each lens group and can be more smoothly driven with no excessive load applied.

The first configuration of a zoom lens apparatus for accomplishing the second object of the present invention comprises, sequentially from the object side, a first lens component with a positive refractive power which may be fixed while changing magnification, a second lens component with a negative power which moves back and forth for variable magnification, a third lens component with a positive refractive power which may be fixed while changing magnification, a fourth lens component with a positive refractive power which corrects the movement of the focal point caused by change of magnification, and a fifth lens component with a comparatively low positive power which may be fixed while changing magnification. When the second lens component moves from the object side to the image side, the focal length of the lens changes from the wide angle side to the telephoto side.

It is desirable that the luminous flux incident to the fourth lens component is almost afocal. In the present invention, it is desirable that the fourth lens component is used for focusing, though the first or third lens component may be used for focusing.

Specifically in the present invention, the first lens component comprises at least one positive lens and at least one negative lens, the second lens component comprises at least two negative lenses and at least one positive lens, the third lens component comprises at least one positive lens, the fourth lens component comprises at least one positive lens and at least one negative lens, and the fifth lens component comprises at least one positive lens, and the lenses satisfy the following conditions:

$$0.25 < |f_2| F_w / (f_w Z) < 0.4 \tag{1}$$

$$1.8 < f_4 / f_w < 2.5 \tag{2}$$

where $f_2$ and $f_4$ indicate the resultant focal length of the second and fourth lens components, respectively; $f_w$ indicates the focal length at the wide angle end of the entire system, $F_w$ indicates the F-number at the wide angle end, and Z indicates the variable magnification ratio.

At least one of the lenses of the fourth or fifth lens component has an aspherical surface, hereinafter referred to as an asphere, which is deformed in the direction that the convex surface is directed from the center to the periphery of the refractive surface when the sphere, with a radius of curvature which is equal to the radius of curvature of the aspheric surface, is convex, or is deformed in the direction that the concave surface is directed from the center to the periphery of the refractive surface when the sphere is concave. Assuming that the deformation value at the effective radius position of the "i"th sphere from the object side is $\Delta i$ and the above direction is positive, it is desirable that the following inequality is held:

$$0.001 < F_w \Sigma \Delta i / f_w < 0.02 \tag{3}$$

A symbol $\Sigma$ indicates the sum of deformation values of all the aspheres of the fourth and fifth lens components. More specifically in the present invention, the first lens component comprises sequentially from the object side, a positive doublet of a negative meniscus lens and a biconvex lens and a positive meniscus lens having a convex surface directed toward the object; the second lens component comprises sequentially from the object side, a negative lens having a more contoured surface directed toward the image and a negative doublet of a biconcave lens and a positive lens; the third lens component is a positive lens or a positive doublet of a positive lens and a negative meniscus lens; the fourth lens component comprises sequentially from the object side, at least a negative lens having a more contoured surface directed toward the image and a positive lens; and the fifth lens component comprises a positive single lens with a comparatively weak refractive power. It is understood that the term "negative doublet" generally refers to a lens consisting of two elements and having an overall negative refractive power, while the term "positive doublet" generally refers to a lens consisting of two elements and having an overall positive refractive power. It is desirable that the lenses satisfy the following conditions:

$$n_{2-} > 1.6 \tag{4}$$

$$\nu_{2-} - \nu_{2+} > 20 \tag{5}$$

$$n_3 \cdot \sqrt{F_w} > 1.8 \tag{6}$$

where:
- $n_{2-}$: average value of refractive indexes of the negative lenses in the second lens component;
- $\nu_{2-}$: average value of Abbe numbers of the negative lenses of the second lens component;
- $\nu_{2+}$: Abbe number of the positive lens of the second lens component; and
- $n_3$: refractive index of the positive lens of the third lens component.

Since the fifth lens component has a comparatively weak positive refractive power and is fixed near the image surface during zooming unlike the other lens components, the focal point is affected little by changes in environmental conditions such as temperature and humidity, and plastic lenses may be used for the fifth lens component in place of glass lenses.

In the basic configuration of the present invention, it is extremely effective in constructing high variable magnification zoom lenses with a variable magnification ratio of about 6 compact, to place the fifth lens component closest to the image side fixed during zooming.

In a zoom lens system of the present invention, the diaphragm is mounted in front of the third or fourth lens component. When the part behind the diaphragm is shortened so as to make the entire system compact, the exit pupil is liable to be extremely close to the image surface. When a solid state imaging device such as a CCD is placed on the image surface, the extraordinary color mixing of the peripheral luminous flux may occur or the relative illumination may be decreased due to changes in the apparent aperture efficiency under the influence of the color filter on the image surface or of the micro lens array when the exit pupil is extremely close to the image surface. When the refractive power of the fifth lens component is made positive and the fifth lens component is placed comparatively close to the image surface, the exit pupil can be located farther away from the image surface so as to eliminate the above failure.

By making the luminous flux incident into the fourth lens component almost afocal, changes in the aberration caused by the movement of the component during zooming can be minimized. When the fourth lens component is moved to the object side for focusing, changes in the aberration caused by the movement of the component during focusing can be minimized.

The reason why the first and fourth lens components with a positive refractive power have at least one negative lens and the second lens component with a negative power has at least one positive lens is to fully correct the longitudinal and transversal chromatic aberration in all over the zooming position. Although the third lens component with a positive refractive power does not always need to include a negative lens, the chromatic aberration of the entire system can be corrected by excessively generating the chromatic aberration of the fourth lens component even if such a negative lens is omitted.

The reason why the second lens component has at least two negative lenses is to fully increase the refractive power of the second lens component, to decrease the movement for zooming, and to reduce the diameter of the front lens.

When the absolute value of the focal length of the second lens component increases beyond the upper limit, the foregoing condition (1) is advantageous in aberration correction, though the length from the first lens component to the third lens component increases and a compact system cannot be obtained. When the absolute value decreases below the lower limit in a simple configuration as mentioned above, changes in the aberration during zooming, particularly changes in the distortion and coma cannot be corrected, and the negative distortion at the wide angle end increases excessively.

When the focal length of the fourth lens component decreases below the lower limit, the length from the front of the fourth lens component to the image surface is apt to become short and the condition (2) is advantageous in shortening of the entire length. However, the entire view angle of the fourth lens component increases, the height of the luminous flux passing through the first lens component increases when it incidents into the corner of the image surface, and the diameter of the front lens increases. When the focal length increases beyond the upper limit, not only the entire length of the lens system increases but also the diaphragm diameter for obtaining a predetermined aperture increases.

The reason why, in the concrete configuration of the present invention, the first lens component comprises sequentially from the object side, a positive doublet of a negative meniscus lens and a biconvex lens and a positive meniscus lens having a convex surface directed toward the object, is to control changes in the spherical aberration and comatic aberration from the middle position to the tele position or zooming. The positive meniscus lens on the image side is almost aplanatic for the luminous flux on the axis and effective for correction of negative distortion which occurs in the second lens component with a strong negative refractive power.

The second lens component comprises sequentially from the object side, a negative lens having a more contoured surface directed toward the image side and a doublet of a biconcave lens and a positive lens. By this configuration, the principal point is located close to the object side, the entire system is prevented from enlargement due to an increase in thickness, and changes in the aberration due to zooming, particularly in the distortion and astigmatism aberration, are minimized. When the third lens component comprises a positive lens, the use of at least one asphere in the lens is advantageous in correction of the spherical aberration. When the third lens component comprises a positive doublet of a positive lens and a negative meniscus lens, the longitudinal chromatic aberration in all over the zooming position can be easily corrected. When the aperture ratio is large, the degree of freedom due to an increase in the number of surfaces can be mainly used for correction of the spherical aberration.

The fourth lens component comprises sequentially from the object side, at least one negative lens having a more contoured surface directed toward the image and at least one positive lens. The strong concave surface of the negative lens on the image side corrects a negative distortion which occurs in the second lens component.

The configuration, that at least one of the aspheres of the fourth or fifth lens component is an asphere which is deformed in the direction that the convex surface is directed from center to the periphery of the refractive surface when the sphere is convex, with a radius of curvature which is equal to the radius of curvature of the axis, or is deformed in the direction that the concave surface is directed from center to the periphery of the refractive surface when the sphere is concave, produces an effect on sufficient correction of a negative distortion which occurs in the second lens component with a high negative refractive power so as to make the zoom system compact.

Under the condition (3), when the sum of asphere deformation values at the effective radius position of the lens surfaces of all the aspheres of the fourth and fifth lens components is lower than the lower limit, the negative distortion at the wide angle end cannot be easily corrected, when the total system is to be compact. When the sum is beyond the upper limit, the distortion can be corrected, though the image surface curvature in all over the zooming position is excessive.

When the refractive index of the negative lens of the second lens component does not agree with the condition (4), it is difficult to correct the negative distortion at the wide angle end in the above configuration.

When the difference between the Abbe numbers of the negative and positive lenses of the second lens component does not agree with the condition (5), changes in the chromatic aberration during zooming, particularly changes in the transversal chromatic aberration are increased, and the image point for shorter wavelength is apt to be shifted excessively toward a smaller image height at the wide angle end or toward a bigger image height at the telephoto end.

When the refractive index of the positive lens of the third lens component does not agree with the condition (6), the spherical aberration cannot be easily corrected in all over the zooming position.

An alternative configuration of a zoom lens apparatus for accomplishing the second object of the present invention is such that in the first configuration, the fifth lens component has a comparatively low negative refractive power. The fifth lens component comprises at least one negative lens. This alternative configuration of the zoom lens agrees with the foregoing conditions (1), (2), and (3).

More specifically in the zoom lens system of the present invention, it is desirable that the fifth lens component comprises a negative single lens with a comparatively weak refractive power, and the zoom lens system agrees with the foregoing conditions (4), (5), and (6).

Since the fifth lens component has a comparatively weak positive refractive power and is fixed near the image surface during zooming unlike the other lens components, the focal point is affected little by changes in environmental conditions such as temperature and humidity, and plastic lenses may be used for the fifth lens component in place of glass lenses.

In the basic configuration of the present invention, when the refractive power of the fifth lens component is made negative, the resultant telephoto ratio of the fourth and fifth lens components can be minimized in particular, and hence the entire length of the lens system can be minimized compared with that when the fifth lens component is not mounted. When the lens system is made compact, a negative distortion generated at the second lens component is apt not to be easily corrected at the wide angle end. However, when the fifth lens component with a negative refractive power is used, such an effect can be partially eliminated, and the entire length of the lens system and the diameter of the front lens can be minimized compared with the conventional ones.

Another configuration of a zoom lens apparatus for accomplishing the second object of the present invention is characterized in that the apparatus comprises, sequentially from the object side, a first positive lens component having at least one negative lens and one positive lens which is fixed during zooming, a second negative lens component which moves according to zooming, a third positive lens component having a single lens with an asphere and a comparatively low refractive power and a positive single lens, wherein the third lens component is fixed during zooming, a fourth positive lens component for correcting changes in the image focal point caused by variable magnification, and a fifth lens component having a single lens with a comparatively weak refractive power which is fixed during zooming.

It is desirable that the lens components secondarily agree with the conditions indicated below. In the second lens component:

$$0.2 < |f_2| F_w / (f_w Z) < 0.4 \quad (7)$$

where:
 $f_w$: Focal length of the entire lens system at the wide angle end
 $f_2$: Focal length of the second lens component
 $F_w$: F-number at the wide angle end of the entire lens system
 $Z$: Zoom ratio In the single lens with an asphere of the third lens component:

$$-0.18 < f_w / f_{3A} < 0.18 \quad (8)$$

$$0.001 < F_w \Delta_3 / f_w < 0.1 \quad (9)$$

where:
 $f_w$: Focal length of the entire lens system at the wide angle end
 $f_{3A}$: Focal length of the single lens of the third lens group which has an aspheric surface
 $F_w$: F number at the wide angle end of the entire lens system
 $\Delta_3$: Deformation value from the master sphere at the clear aperture radius position of the asphere of the third lens component, the radius of curvature of said master sphere is equal to the radius of axial curvature of said aspheric surface In the fourth lens component:

$$0.3 < f_w / f_4 < 0.7 \quad (10)$$

where:

$f_w$: Focal length of the entire lens system at the wide angle end
$f_4$: Focal length of the fourth lens component It is desirable that the fourth lens component comprises at least one positive lens and one negative lens. In the single lens of the fifth lens component:

$$-0.20 < f_w / f_5 < 0.20 \quad (11)$$

where:
 $f_w$: Focal length of the entire lens system at the wide angle end
 $f_5$: Focal length of the fifth lens component It is desirable that the fifth lens component has an aspheric surface.

The first lens component of the zoom lens system of the present invention has sequentially from the object side at least one negative lens and one positive lens, which are fixed during zooming and have a positive refractive power. The use of at least one negative lens and one positive lens allows satisfactory correction of the transversal and longitudinal chromatic aberration. The second lens component has a negative refractive power and moves on the optical axis so as to perform zooming. The third lens component is fixed during zooming and has a positive refractive power as a whole. The single lens with a comparatively weak refractive power of the third lens component has an aspheric surface which corrects mainly aberrations due to the aperture. This weak refractive power allows changes in the performance such as changes in the back focal length caused by changes in the environment to be insignificant in practical use even when such machinable plastics are used for a decrease in cost. The positive single lens of the third lens component makes the divergent luminous flux from the second lens component almost afocal and sends it to the fourth lens component.

The fourth lens component has a positive refractive power and moves in accordance with changes in the image focal point caused by the variable magnification by the second lens component so as to correct those changes.

In the present invention, the first, third, or fourth lens component can be used for focusing. However, since the light irradiated to the fourth lens component is almost afocal, changes in the aberration caused by the movement of the fourth lens component are comparatively minimized and it is advantageous to use the fourth lens component for focusing from a viewpoint of performance and compactness.

The fifth lens component comprises a single lens with a comparatively weak refractive power which is fixed during zooming. When the fifth lens component is mounted close to the image surface, the astigmatism aberration and the distortion can be satisfactorily corrected without greatly affecting other aberrations. The fifth lens component has a comparatively weak refractive power. Assuming that the image magnification (of the reduction system) of the fifth lens component is $m_5$ when the fifth lens component has a positive refractive power, the movement distance of the fourth lens component during zooming increases in proportion to the square of $1/m_5$ of a change in the image focal point during variable magnification. As a result, when the fifth lens component has a positive high refractive power, the movement distance of the fourth lens component increases, the space for movement becomes wider, and the entire lens system cannot be made compact. Particularly when the fourth lens component is used for focusing, it may undesirably interfere with the third lens component. When the fifth lens component has a negative high refractive power, the movement distance of the fourth lens component decreases and the negative distortion at the wide angle end can be minimized. By doing this, the system can be made advantageously compact, while the spherical aberration due to an increase in the refractive power of the fourth lens component cannot be satisfactorily corrected.

It is desirable that the fifth lens component has at least an aspheric surface because it is effective on aberration correction, particularly on satisfactory correction of the astigmatism aberration at a wide view angle. Furthermore, since the fifth lens component is mounted close to the image surface, the change of optical characteristics of the fifth lens component caused by humidity or temperature change does not significantly influence on the performance and back focal length of the entire system, even when environmentally unstable materials like plastics are used. Therefore, such plastics can be used in place of glass for a decrease in cost.

The foregoing condition (7) indicates the conditions for the focal length of the second lens component, the focal length of the entire system at the wide angle end, and the zoom ratio. When the calculated value is more than the upper limit, the movement distance of the second lens component during zooming, the gap between the first and third lens components becomes wider, and the system cannot be made compact. When the calculated value is less than the lower limit, changes in the astigmatism aberration and the distortion during zooming cannot be easily corrected.

The condition (8) indicates the conditions for the focal length of the single lens of the third lens component which has an aspheric surface and a comparatively weak refractive power and the focal length of the entire system at the wide angle end. When the calculated value is more than the upper limit, the spherical aberration is corrected insufficiently. When the calculated value is less than the lower limit, the contrast decreases and the image quality degrades because the spherical aberration is corrected excessively. When the conditions are satisfied, changes in the back focal length, when plastics are used in place of glass can be minimized.

The condition (9) indicates the conditions for the asphere deformation of the single lens of the third lens component which has an aspheric surface and a comparatively weak refractive power, the focal length of the entire system at the wide angle end, and the F-number. When the calculated value is more than the upper limit, the error sensitivity for decentering of the lens increases, causing a problem in actual use. When the calculated value is less than the lower limit, the spherical and comatic aberrations cannot be easily corrected.

The condition expression (10) indicates the conditions for the focal length of the fourth lens component and the focal length of the entire system at the wide angle end. When the calculated value is more than the upper limit, the outward comatic aberration at a wider view angle increases and the resolution decreases. When the calculated value is less than the lower limit, the movement distance of the fourth lens component increases and the system cannot be made compact. It is desirable that the fourth lens component has at least one positive lens and one negative lens so as to minimize the transversal chromatic aberration.

The condition (11) indicates the conditions for the focal length of the fifth lens component and the focal length of the entire system at the wide angle end. The problem which occurs when the focal length of the fifth lens component is decreased is described previously. When the calculated value is more than the upper limit, the negative distortion at the wide angle end increases in particular. When the calculated value is less than the lower limit, the exit pupil is excessively close to the image surface.

DETAILED DESCRIPTION OF THE PREFERRED EMBODIMENTS

The embodiments of the present invention be described in detail hereunder.

Figure 1:
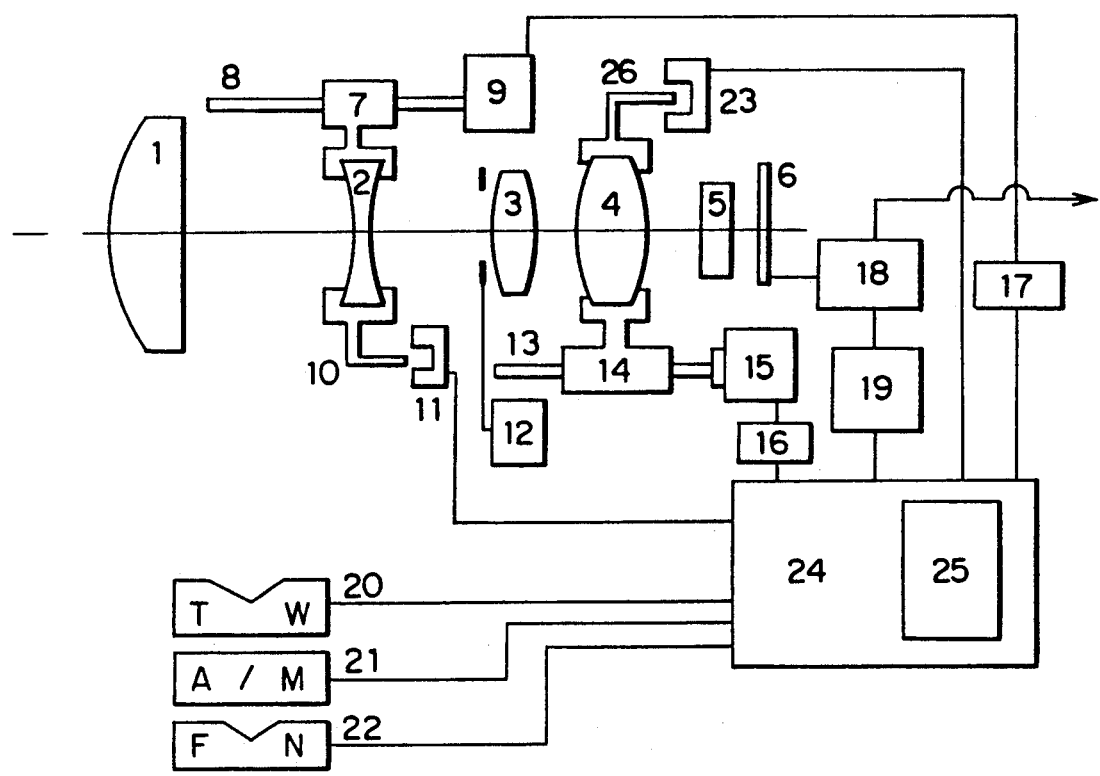
FIG. 1 is a system diagram of a first embodiment of a zoom lens apparatus of the present invention.

FIG. 1 is a schematic view of the first embodiment. In the figure, numerals 1 to 4 indicate an example of the zoom lens system. Numeral 1 indicates a fixed lens component, 2 indicates a lens component for variable magnification, 3 indicates a fixed lens component, and 4 indicates focusing lens component. When the focusing lens component moves, the focal length of the lens system changes naturally.

The lens movement for zooming or focusing is controlled by a calculation control unit 24. The focusing function is performed by rotating a screw shaft 13 by a drive motor 15 via a drive circuit 16 and moving a holding frame 14 of the lens component 4 connected to the screw shaft 13. The zooming function drives a screw shaft 8 of a drive motor 9 via a drive circuit 17 and drives a screw shaft 13 of a drive motor 15 via a drive circuit 16 and moves both lens component 2 and lens component 4, keeping a certain position relation mutually.

Figure 4:
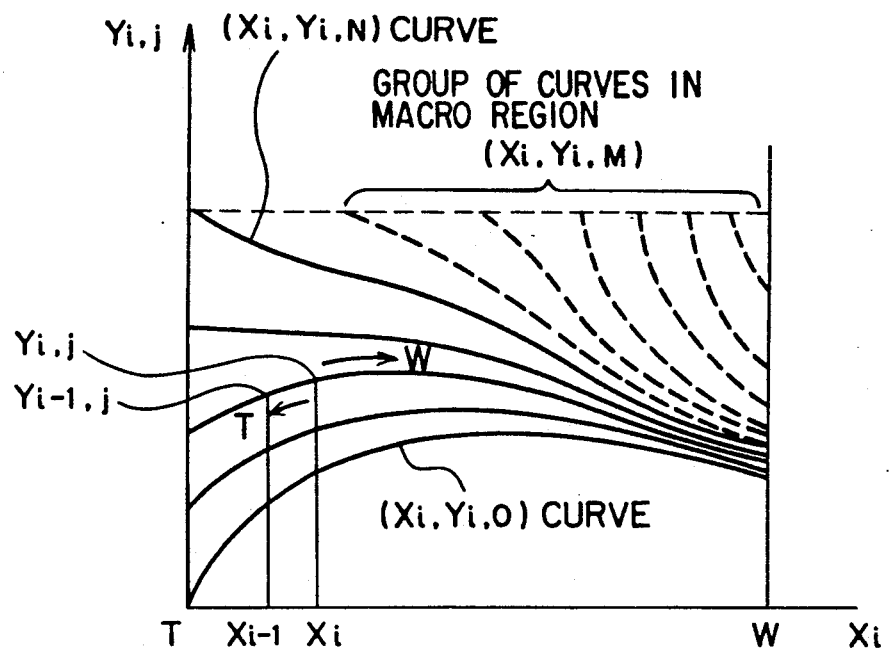
FIG. 4 shows the position trajectories of the fourth lens group during zooming for various object distances.

The lens component movement distance is specified in a position table stored in a memory 25 of the calculation control unit 24. FIG. 4 shows an example of a position table of the position trajectories of the fourth lens group during zooming for various object distances. In the position table shown in FIG. 4, a symbol $X_j$ corresponds to the position of the second lens component and $Y_{ij}$ corresponds to the position of the fourth lens component. A symbol i of each curve in the figure is constant and indicates a certain point of zoom position. A symbol j indicates a certain point of object distance. When the object distance changes, a curve corresponding to different object distance point j is selected by the control unit 24. $(X_i, Y_{i,O})$ indicates the position set on an infinite object distance zoom curve and $(X_i, Y_{iN})$ indicates the position set on the closest object distance zoom curve. $(X_i, Y_{i,M})$ indicates the position set on the zoom curves in the macro-focusing region indicated by dashed lines.

Numerals 5 and 6 shown in FIG. 1 indicate a low-pass filter and an imaging sensing device for video picture taking and for detecting focusing error as well, 18 indicates a signal processing circuit therefor, and 19 indicates a focal error signal detection circuit. Numerals 11 and 23 indicate photo-interrupters which are used to determine the initial position of each lens component using light baffle plates 10 and 26 mounted on the lens holding frames 7 and 14. Numerals 20 to 22 indicate manual switches; that is, 20 indicates variable magnification direction instruction switch, 21 indicates an AUTO - MANUAL selector switch, and 22 indicates focus adjustment direction instruction switch.

Figure 3A:
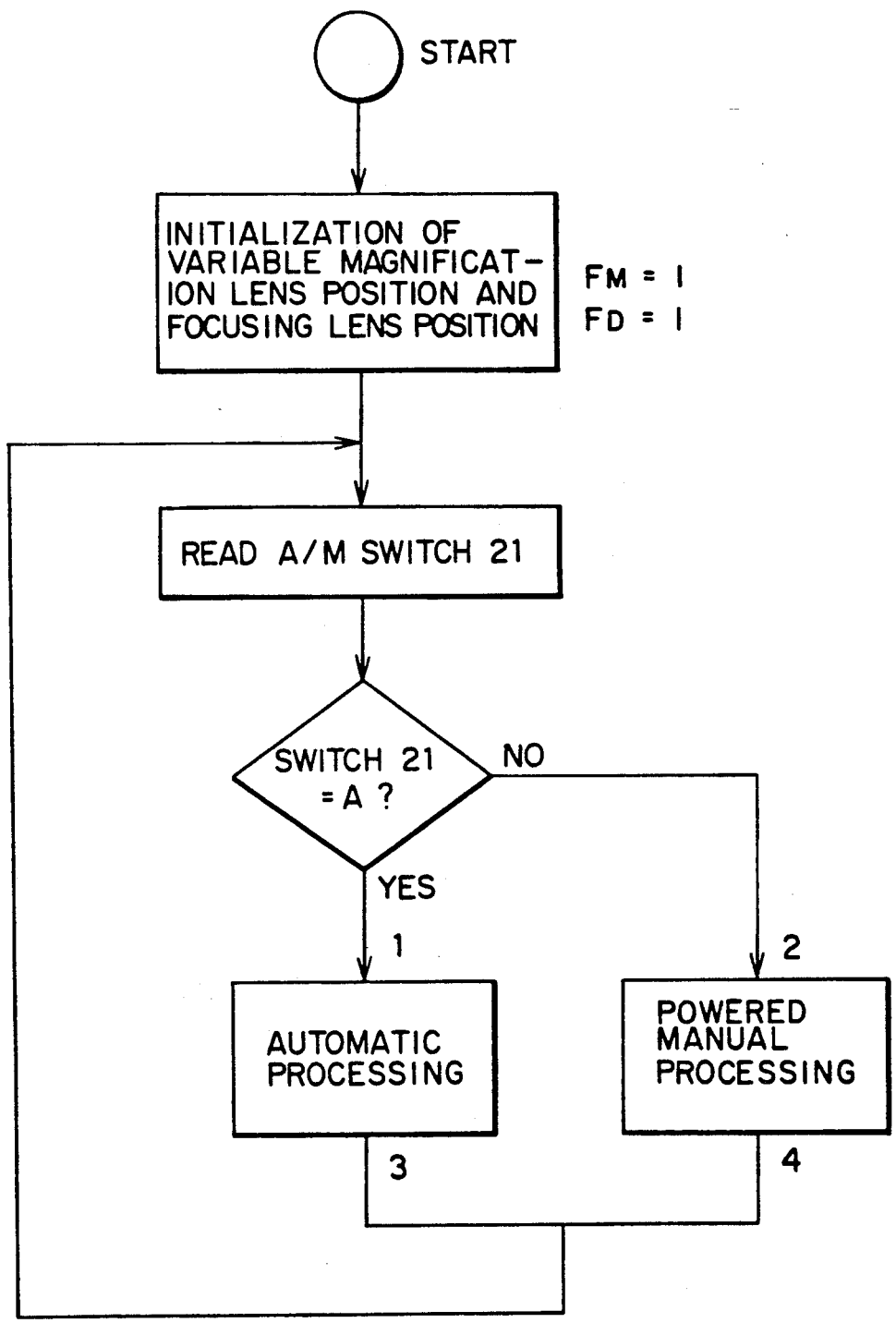

When the power switch of the system is turned on, the calculation control unit 24 storing the program flow shown in FIG. 3(a) executes an initialization routine, drives the variable magnification lens component 2 and the lens component 4 for zoom compensation and focusing to the initial position specified by the signal changes of interrupters 11 and 23, and resets position memories MX and MY of the lens components 2 and 4 to a predetermined value (for example 0) when the outputs of the photo-interrupters 11 and 23 reach a predetermined signal level on account of the interruption of baffle plate 10 and 26. An AF control mode flag $F_M$ and a focusing lens control direction specification flag $F_D$ are also initialized simultaneously. Then, one of the modes indicated below is processed according to the selection status of the AUTO-MANUAL selector switch 21.

Item 1. The switch 21 selects MANUAL M.

Figure 3B:
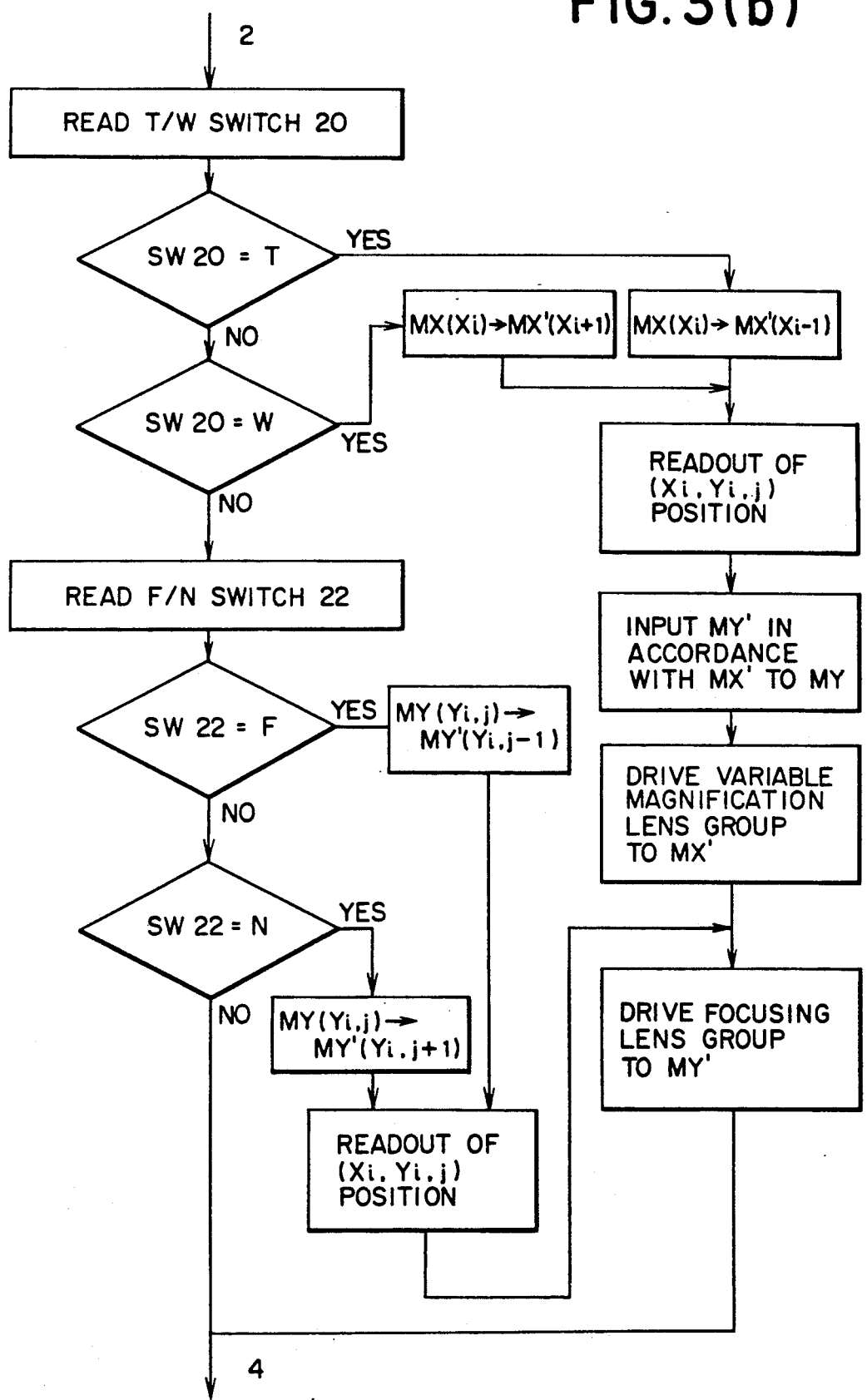

FIG. 3(b) shows a processing flow chart in this case. The calculation control unit 24 enters the standby state for a signal from the variable magnification instruction switch 20 or the focus adjustment instruction switch 22. When the switch 20 outputs a signal indicating the telephoto side T or the wide angle side W, a curve including $(X_i, Y_{i,j})$ is selected from the position table 25 of the lens components 2 and 4 which is stored in the calculation control unit 24 in accordance with $(X_i, Y_{i,j})$ stored in the position memories MX and MY. When the switch 20 outputs a signal indicating the telephoto side T, the data of the memory MX and MY are replaced by the adjacent position set $(X_{i-1}, Y_{i-1,j})$, and the lens components 2 and 4 are driven along the optical axial direction to the corresponding position by stepping motors 9 and 15. Since the lens components are driven tracing to the curve $(X_i, Y_{i,j})$ in the position table 25, which is predetermined, as mentioned above, the focus is kept within the depth of focus. While the switch 20 is held pressed, the above procedure is repeated and the variable magnification is performed.

When the switch 22 is pressed, the memory MY is updated without changing the memory MX from $X_i$. When the switch 22 is turned to the near side N, the memory MY is replaced by, the data $Y_{i,j+1}$ of adjacent curve $_{j+1}$, and the lens component 4 is driven out in accordance with it. When the switch 22 is turned to the far side F, the memory MY is subtracted and the lens component 4 is driven in accordance with it. When the lens component 4 is controlled to the standard curve $(X_i, Y_{i,o})$ at an infinite object distance, further subtraction is prohibited even if the switch 22 is pressed again in order not to move over infinity.

The near side is optional because it is determined by design of each lens system. In this embodiment, the focusing operation is performed until $Y_{i,j}$ reaches $Y_{i,N}$ where j becomes N corresponding to the minimum object distance.

Thereafter, even if the switch 22 is pressed, the lens group 4 is kept stopped and the input is ignored. When (MX, MY) is on one of the curves within the normal imaging distance range from the curve O of $(X_i, Y_{i,o})$ to the curve N of $(X_i, Y_{i,N})$, the focus is kept within the depth of focus for each object distance j over the whole zooming range from Tele end to Wide end. In the macro region curve group $(X_i, Y_{i,M})$, the focal point can be kept within the depth of focus only between $X_i$ where $Y_{i,M}$ is equal to $Y_{i,N}$ and the wide angle end.

Numerical values of the curve group are stored as digital values, and digital positions closest to the curves in FIG. 4 are stored and read in the $(X_i, Y_{i,j})$ table. A slight position error occurs for digitization between the analog and digital values, and the lens component movement stepping pitch and the zoom stepping pitch are also determined so that the position error is within the depth of focus.

Item 2. The switch 21 selects AUTO A.

Figure 3C:
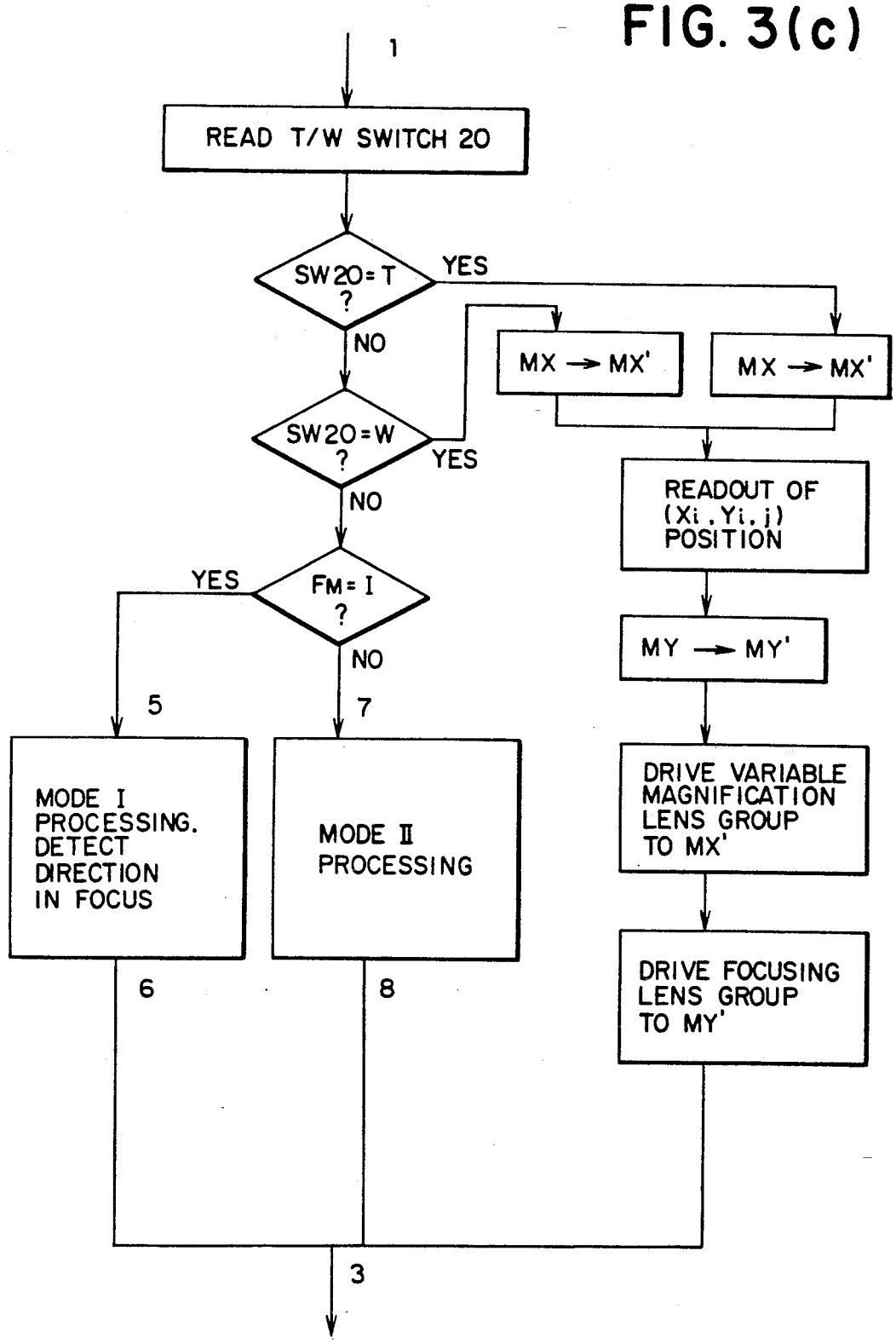

FIGS. 3(c) and 3(d) show a processing flow chart in this case. In this example system, variable magnification function is given the priority to the automatic focusing and when the zooming instruction switch 20 is pressed, the automatic focusing control function is stopped, the zoom control function described in Item 1 is executed using the MY and MX values, and the zooming function is performed keeping the focus within the depth of focus for the initial object distance.

Figure 5:
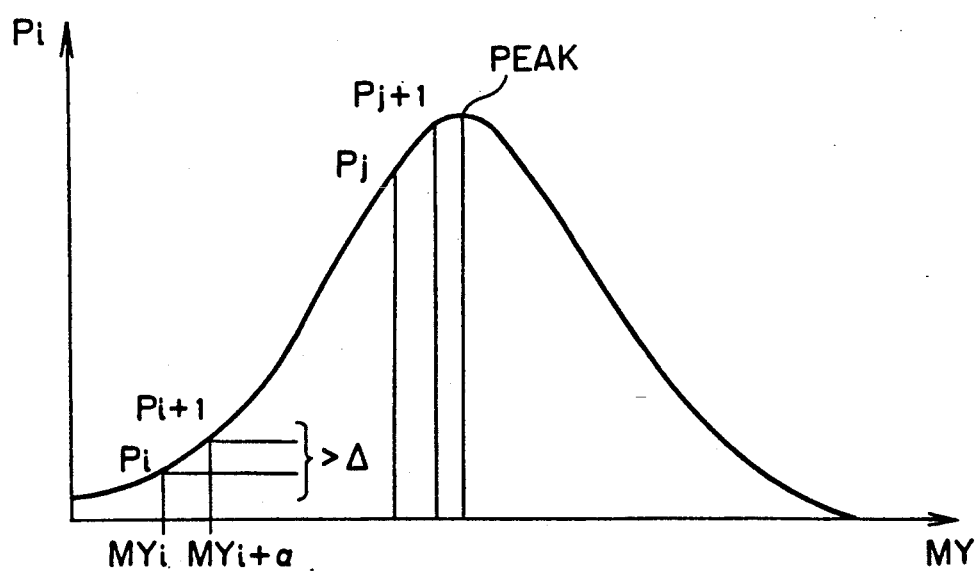
FIG. 5 is a video signal diagram for focusing detection.
Figure 6:
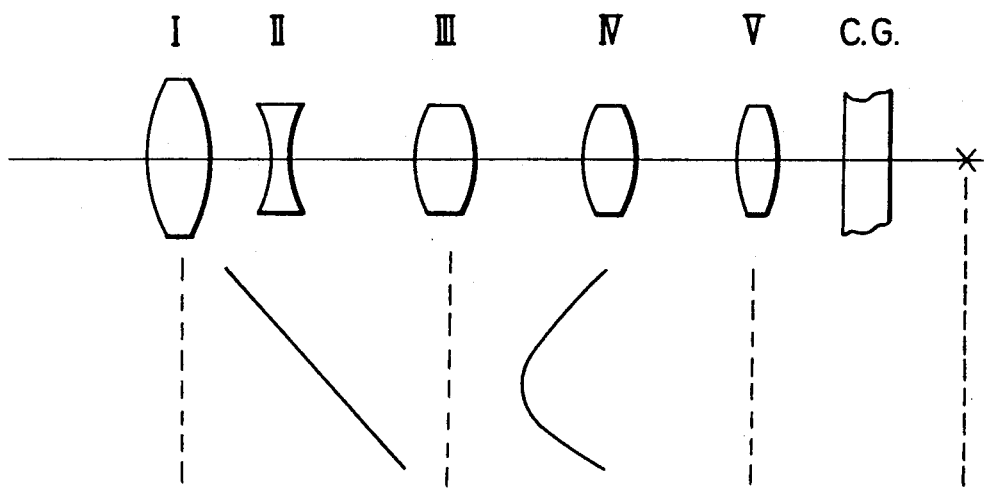
FIG. 6 is an optical layout diagram showing the basic configuration of the zoom lens system of the present invention.
Figure 7:
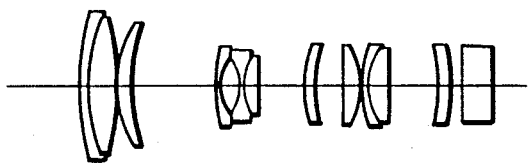
FIGS. 7, 8, and 9 are cross-sectional views of second, third, and fourth embodiments of the present invention, respectively.
Figure 8:
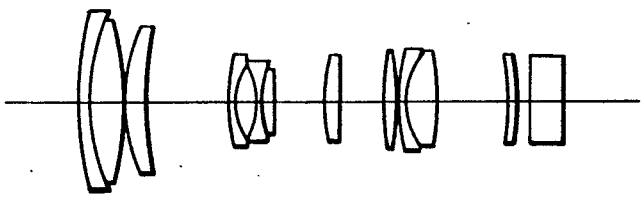
Figure 9:
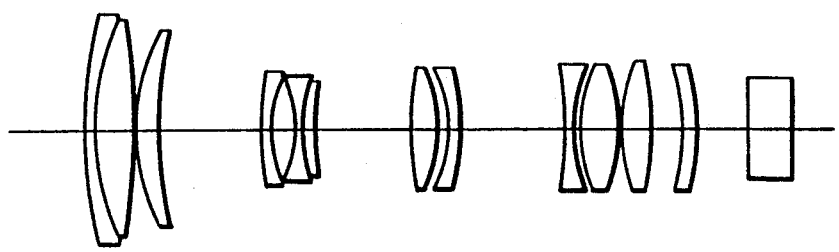
Figure 10A:
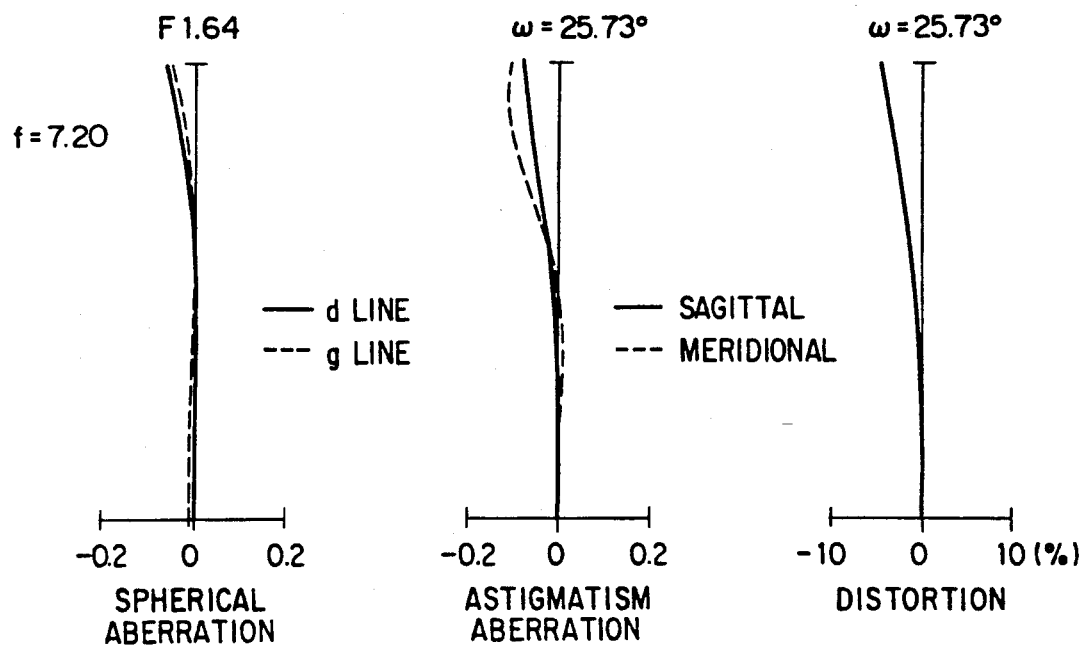
FIGS. 10($a$) through 10($c$), 11($a$) through 11($c$), and 12($a$) through 12($c$) show aberration curves of the second, third, and fourth embodiments, respectively.
Figure 10B:
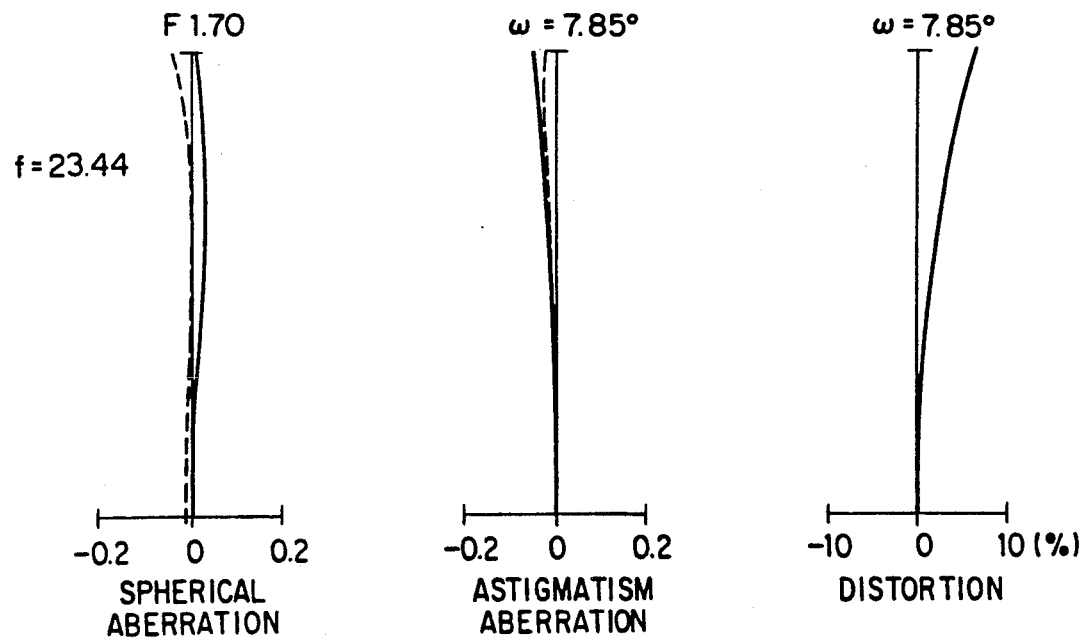
Figure 10C:
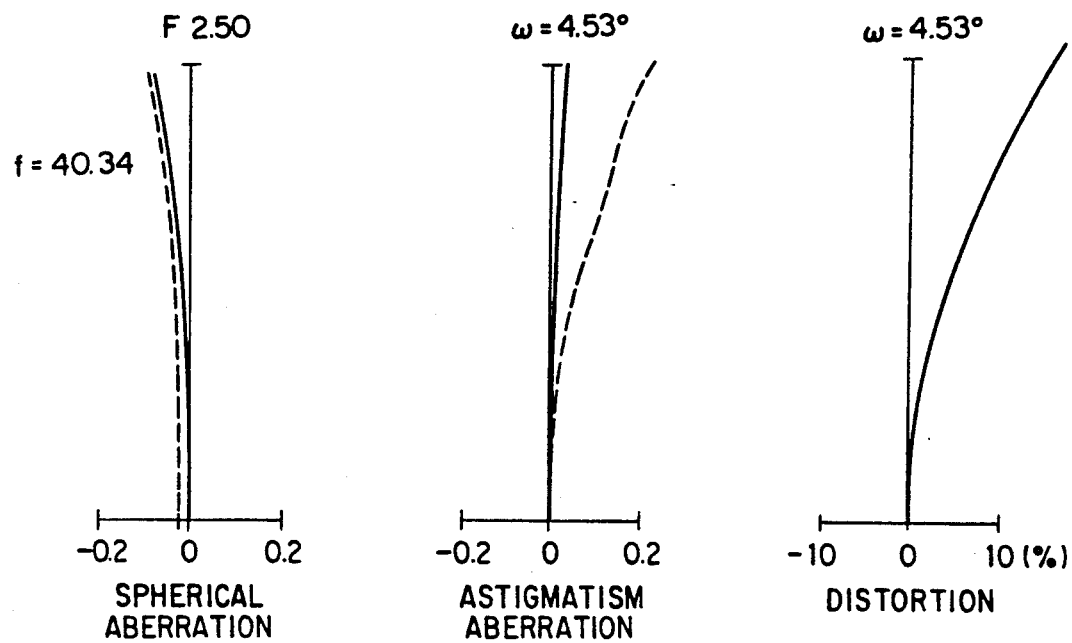
Figure 11A:
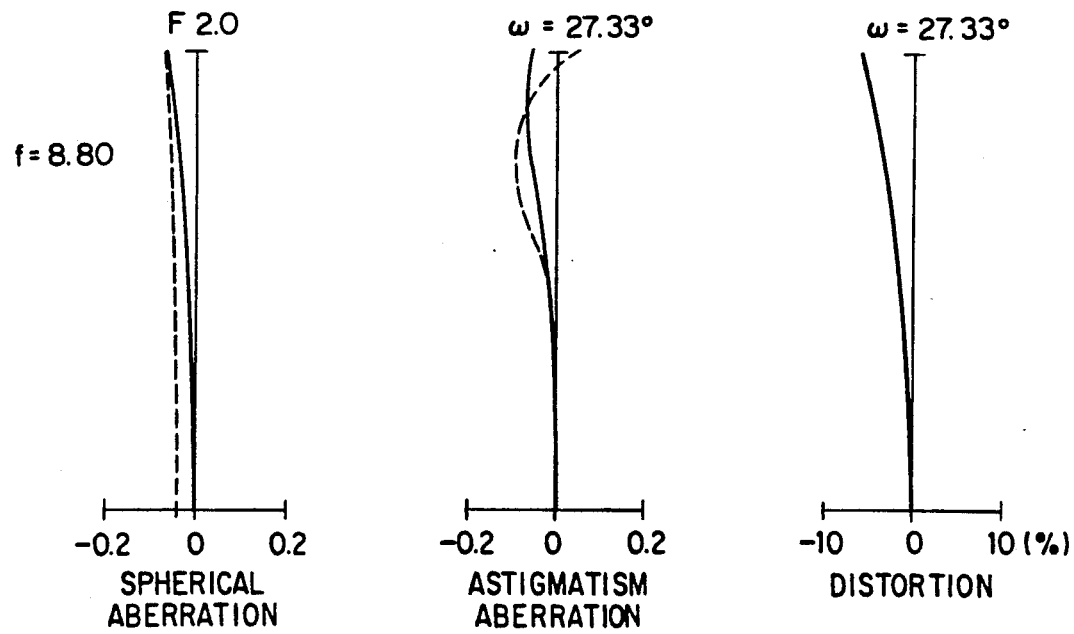
Figure 11B:
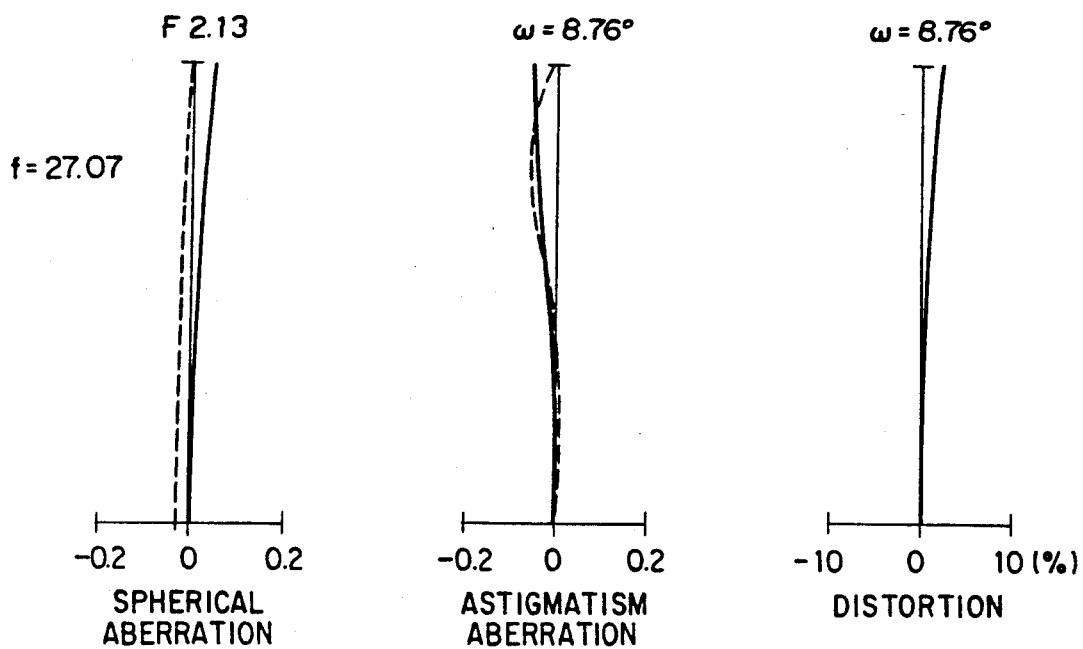
Figure 11C:
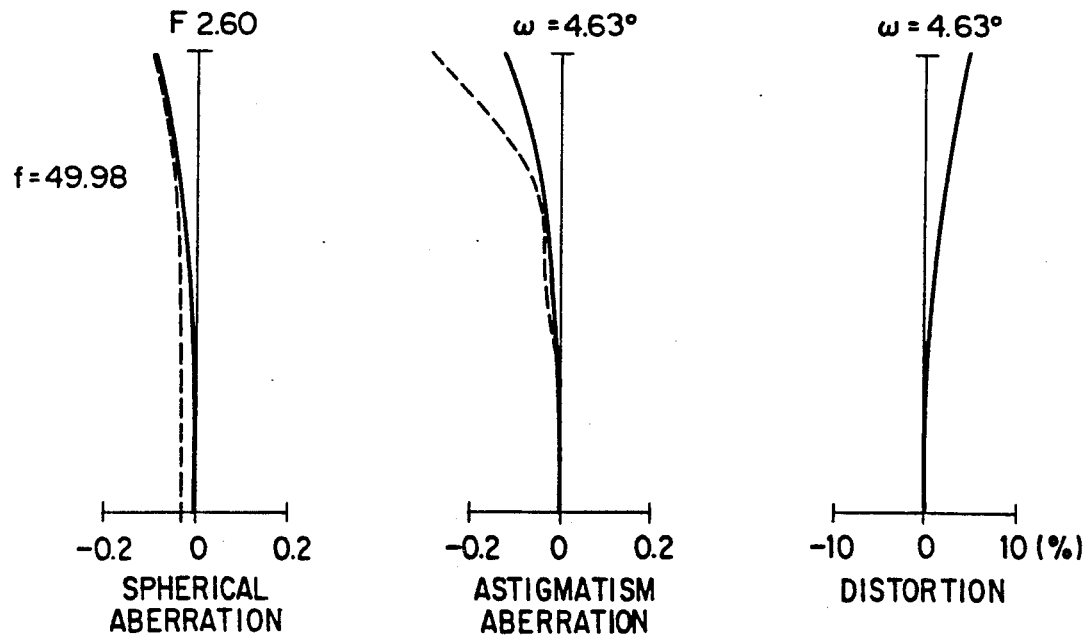
Figure 12A:
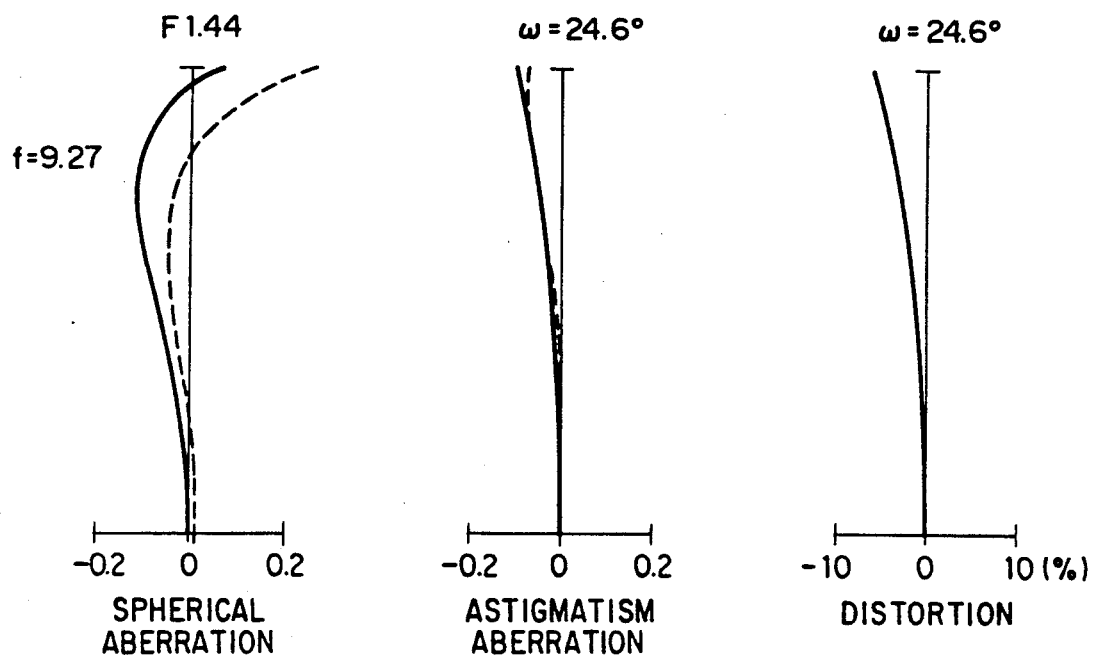
Figure 12B:
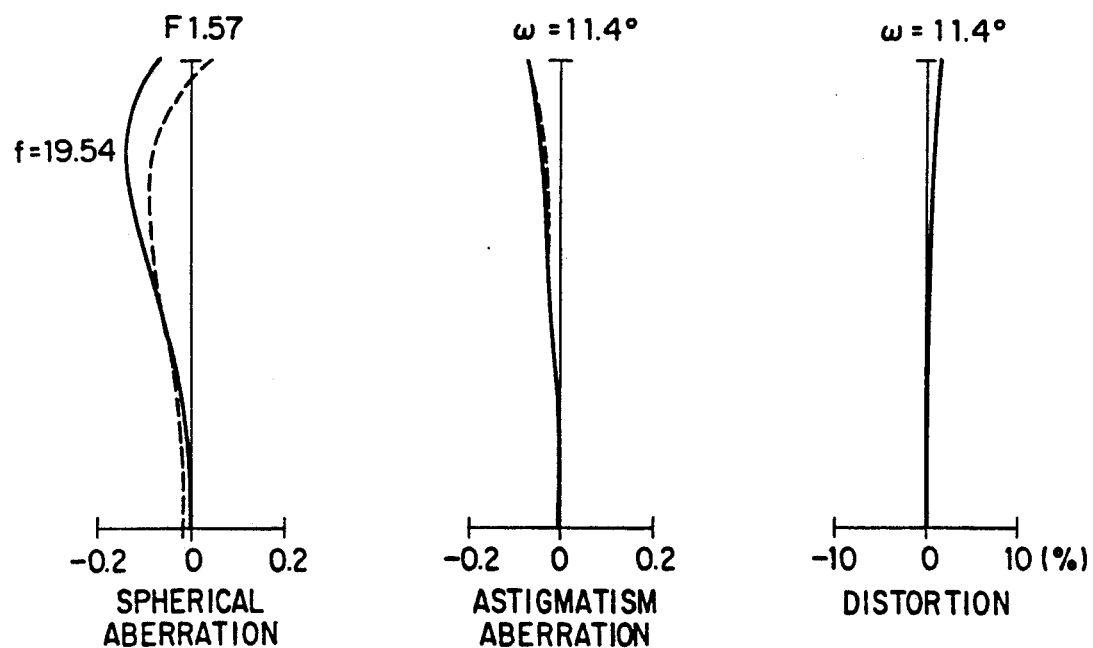
Figure 13:
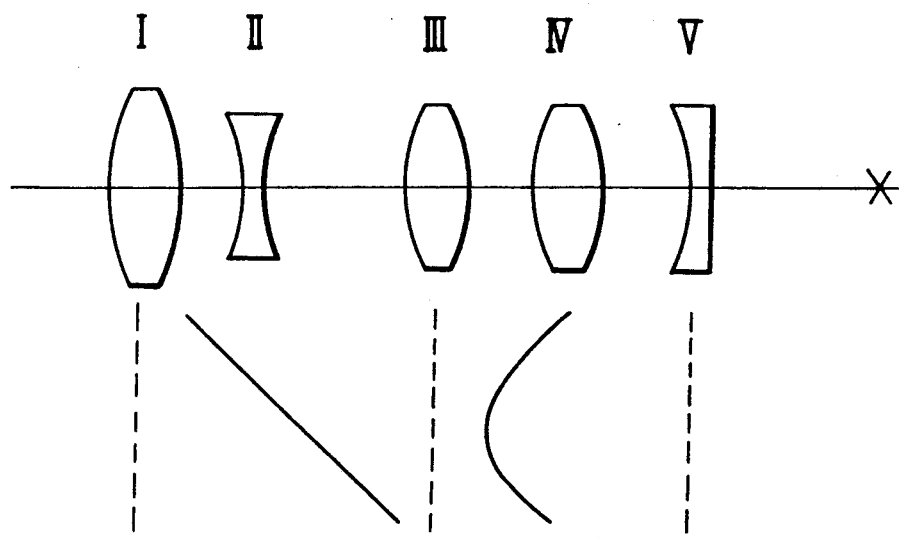
FIG. 13 is an optical layout diagram showing another basic configuration of the zoom lens system of the present invention.
Figure 14:
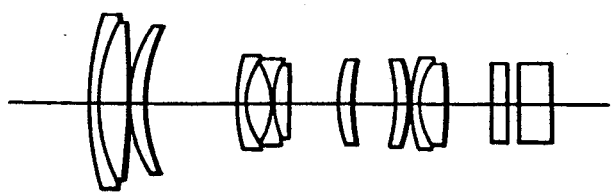
FIGS. 14, 15, 16, and 17 are cross-sectional views of embodiments 5, 6, 7, and 8 of the zoom lens system of the present invention, respectively.
Figure 15:
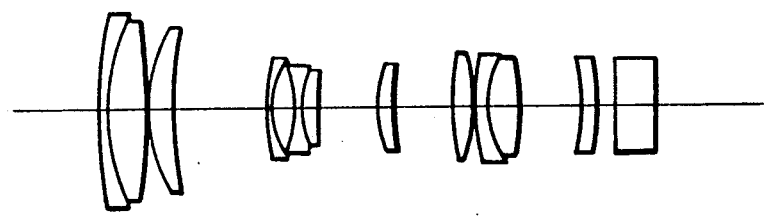
Figure 16:
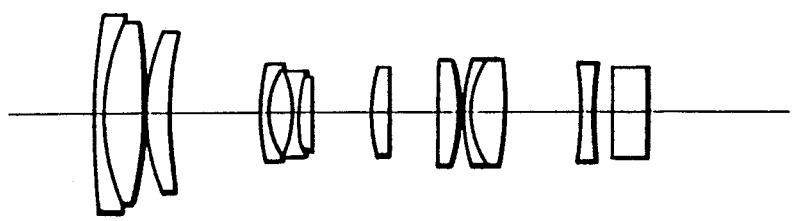
Figure 17:
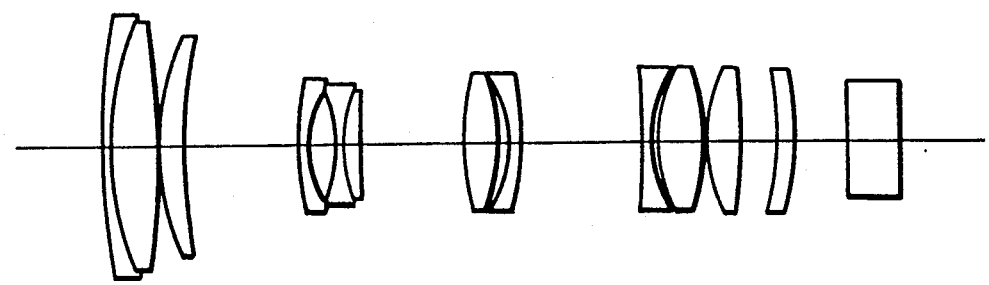
Figure 18A:
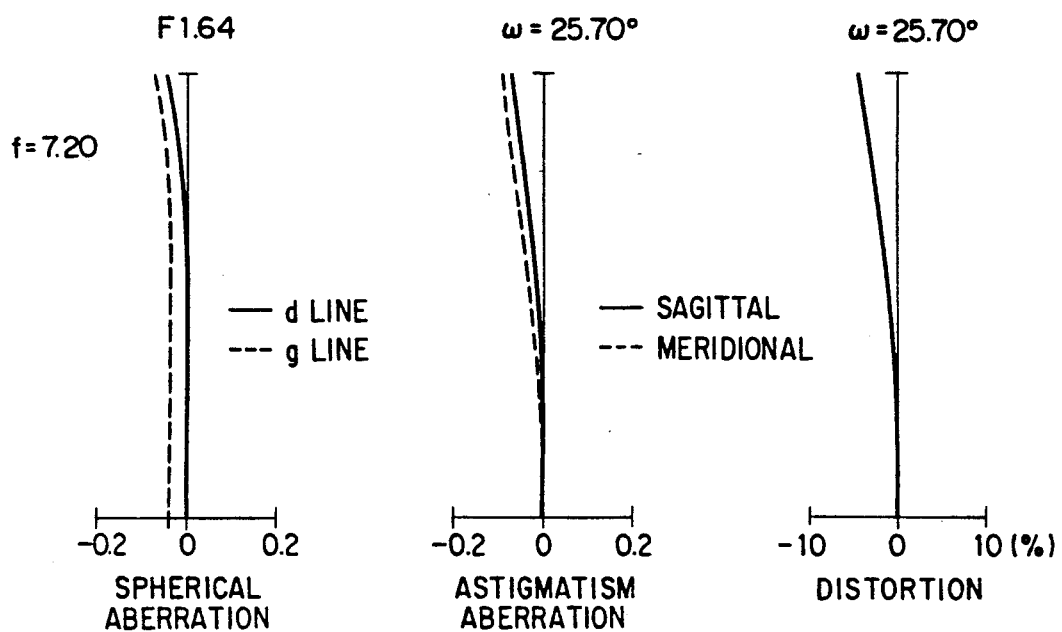
FIGS. 18($a$) through 18($c$), 19($a$) through 19($c$), 20($a$) through 20($c$) and 21($a$) through 21($c$) show aberration curves of the embodiments 5, 6, 7, and 8, respectively.
Figure 18B:
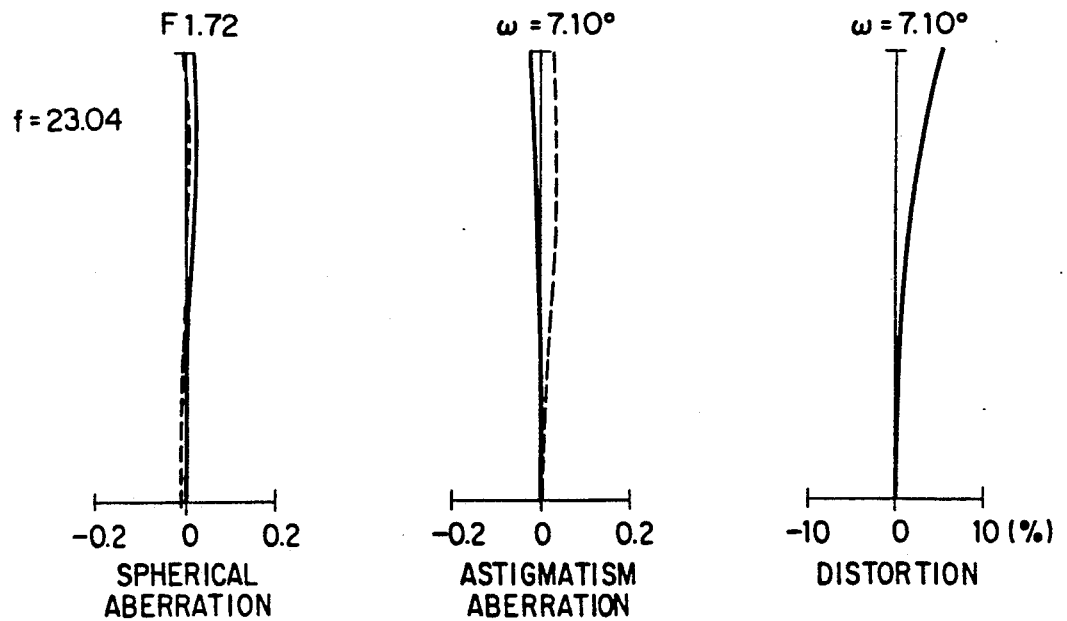
Figure 18C:
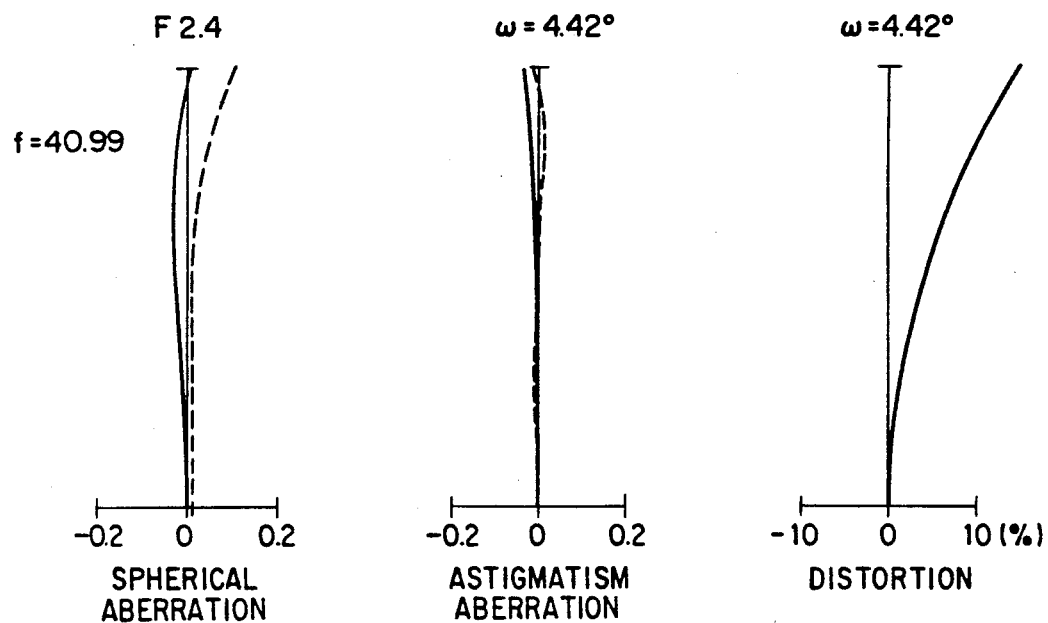
Figure 19A:
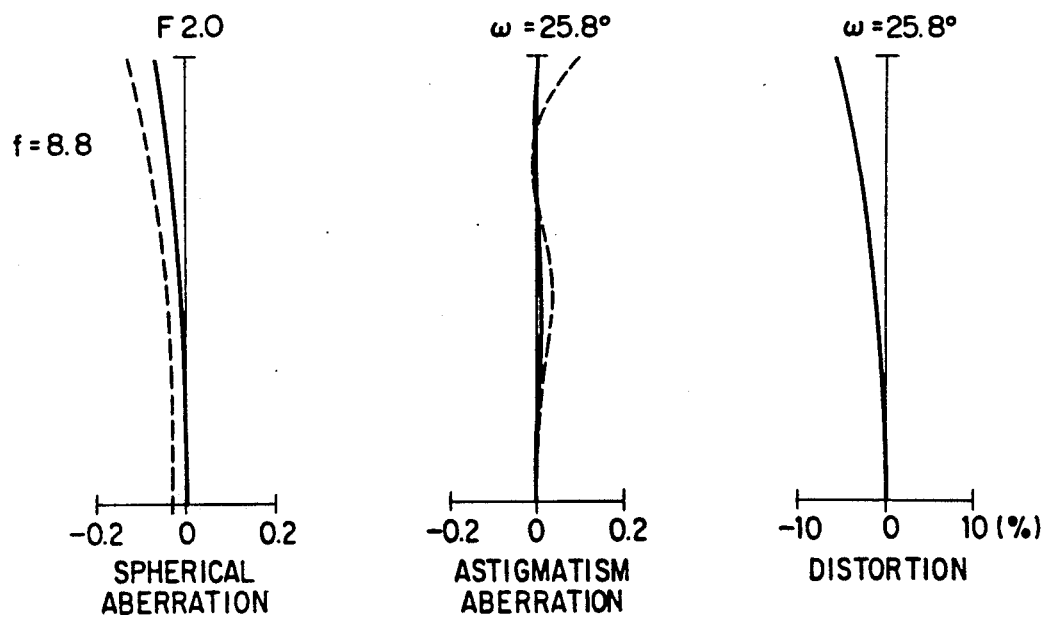
Figure 19B:
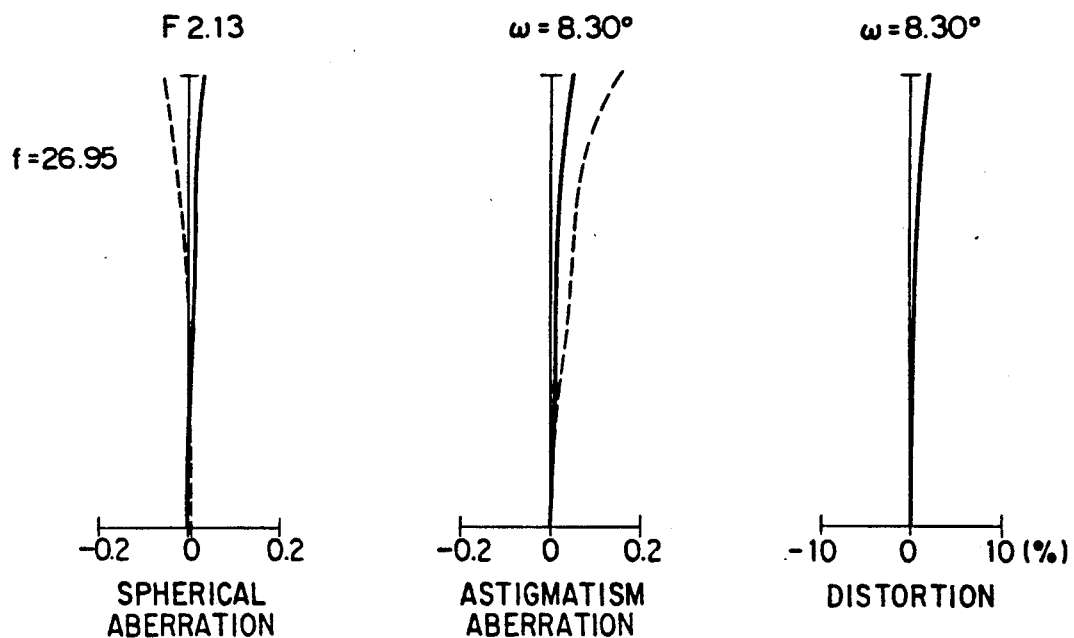
Figure 19C:
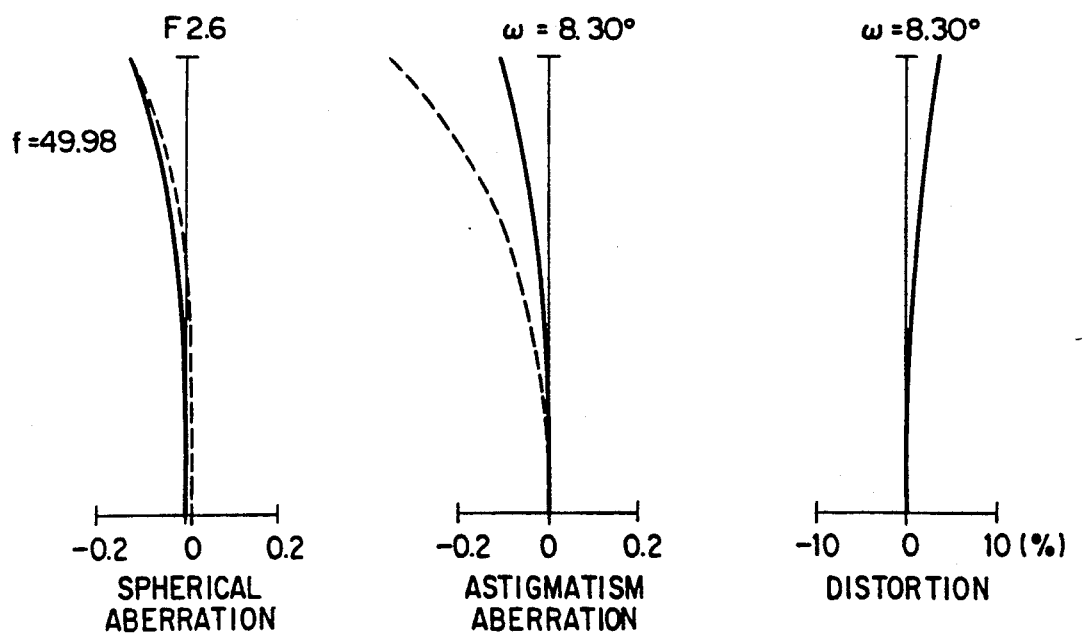
Figure 20A:
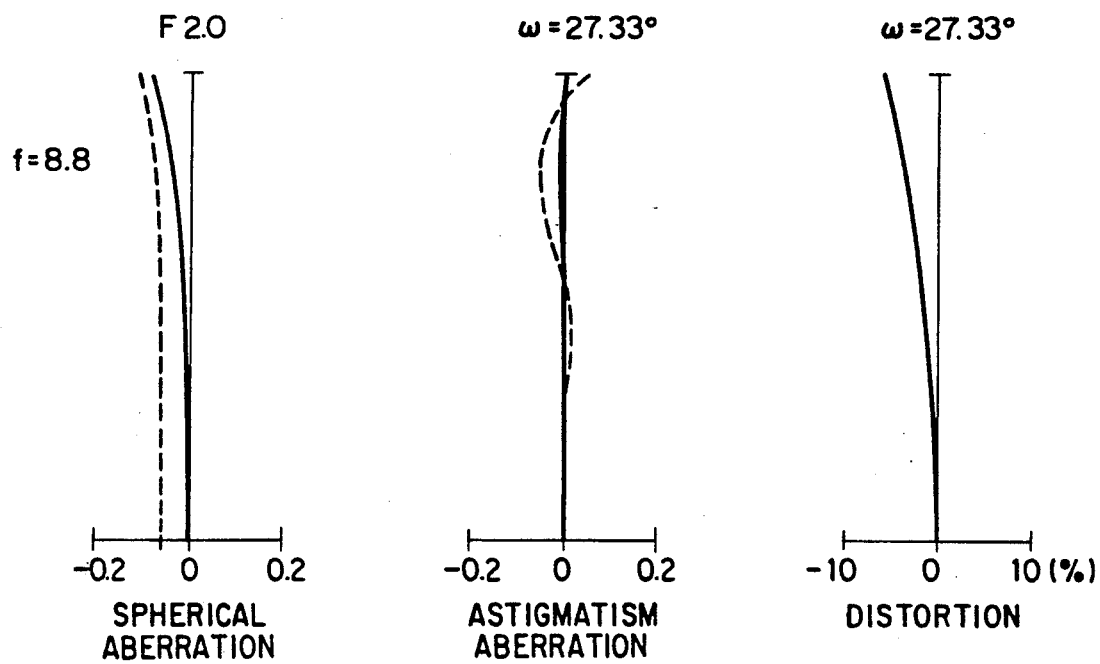
Figure 20B:
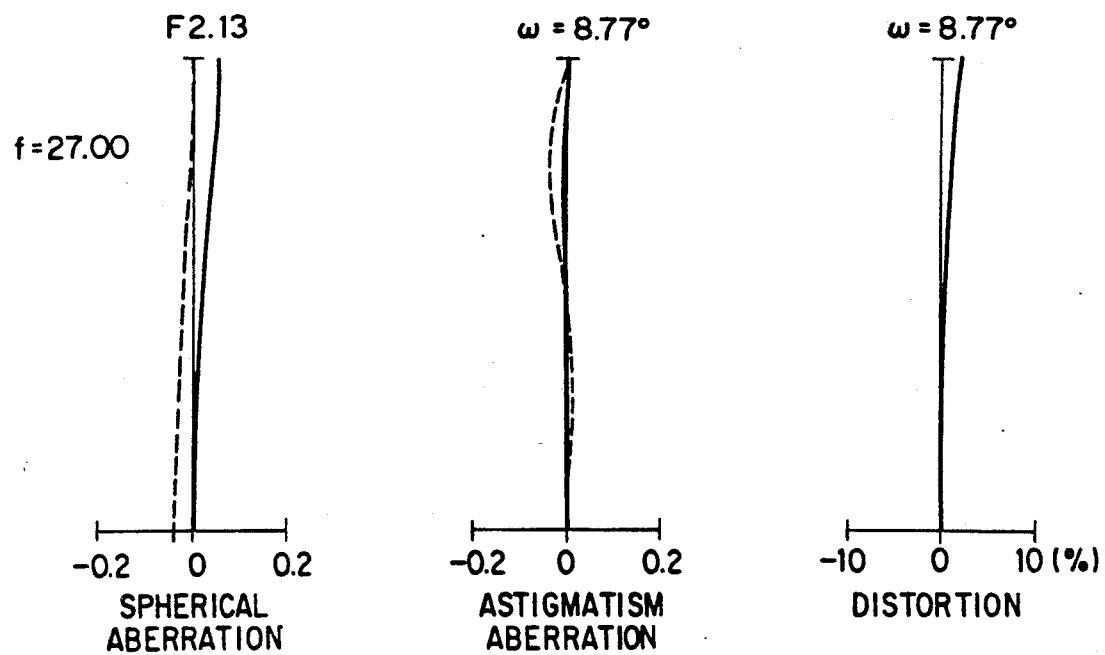
Figure 21B:
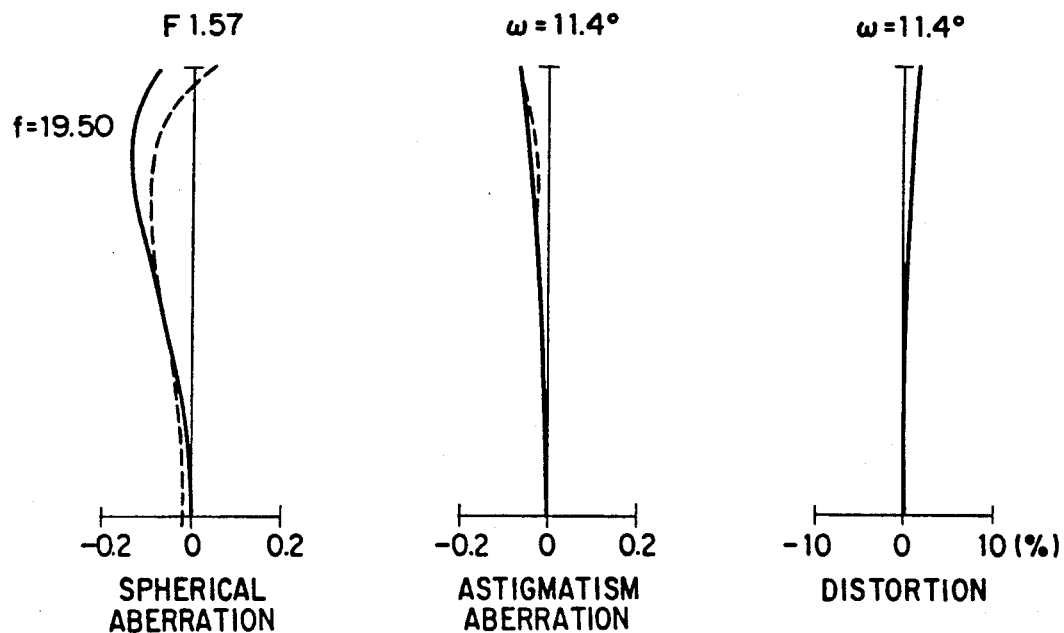
Figure 21C:
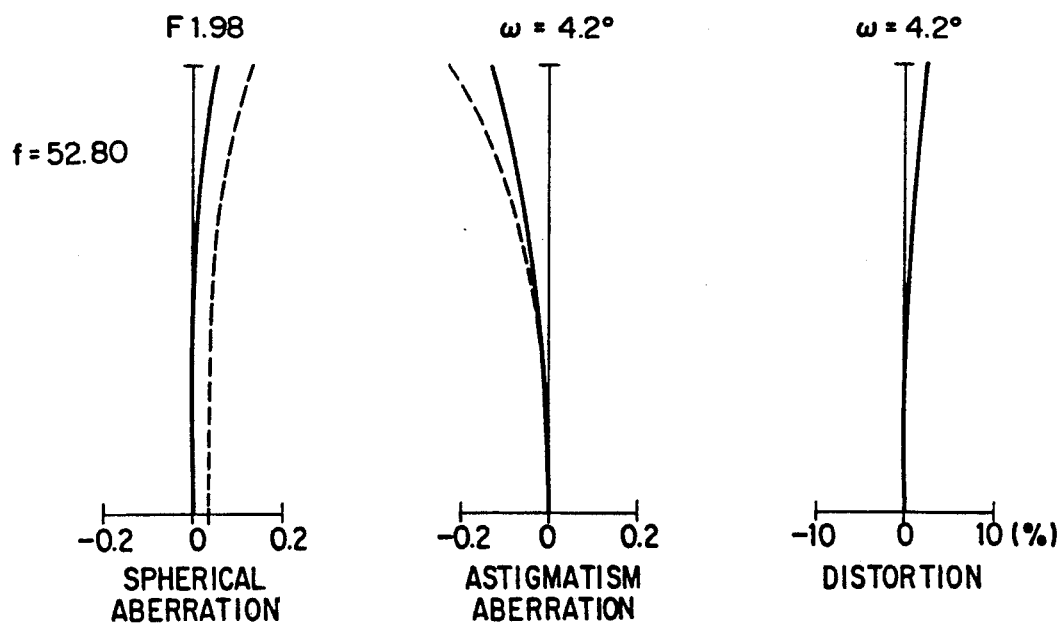
Figure 22:
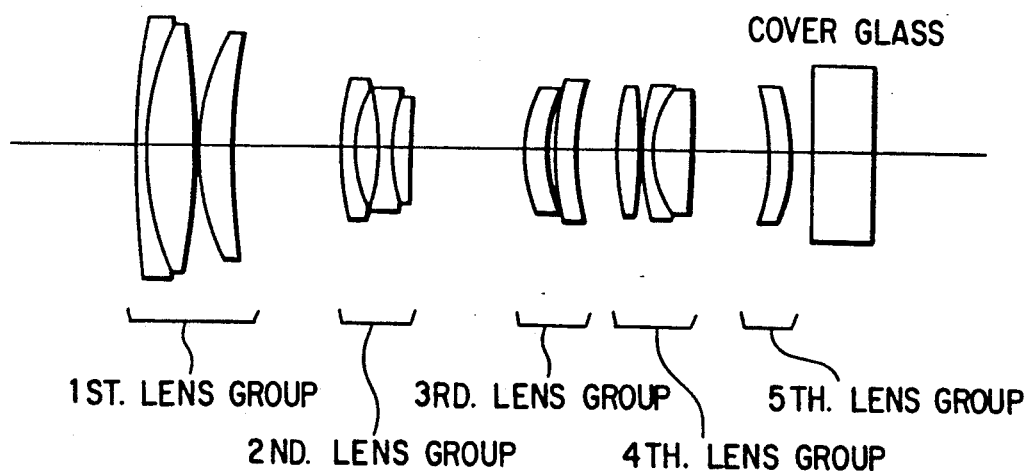
FIGS. 22, 23, 24, 25, and 26 are cross-sectional views of embodiments 9, 10, 11, 12, and 13 of the zoom lens system of the present invention, respectively.
Figure 23:
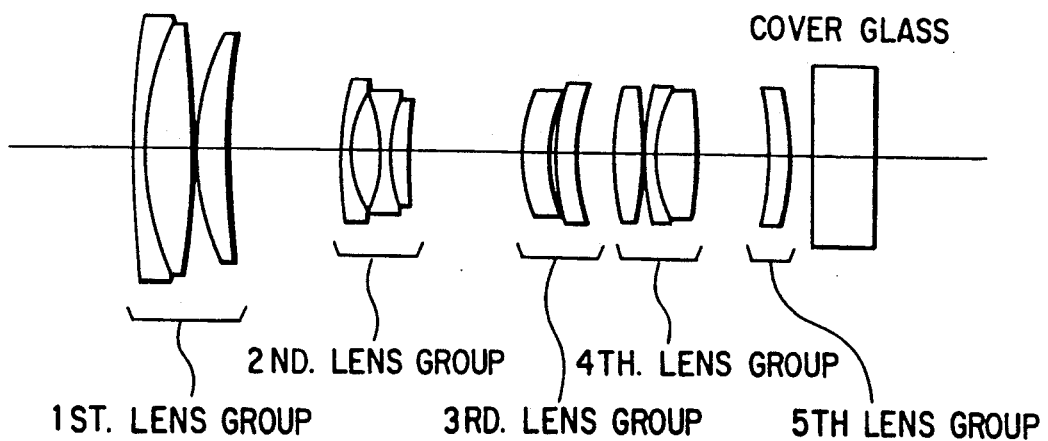
Figure 24:
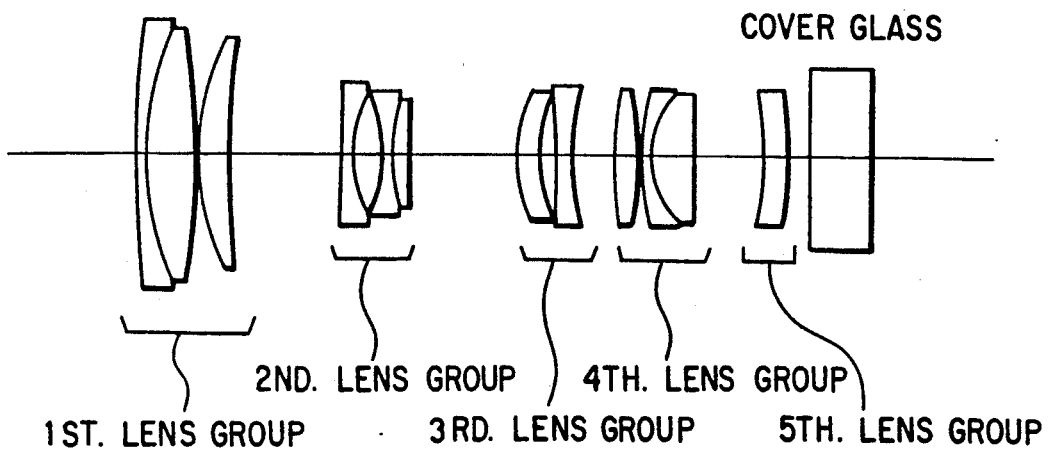
Figure 25:
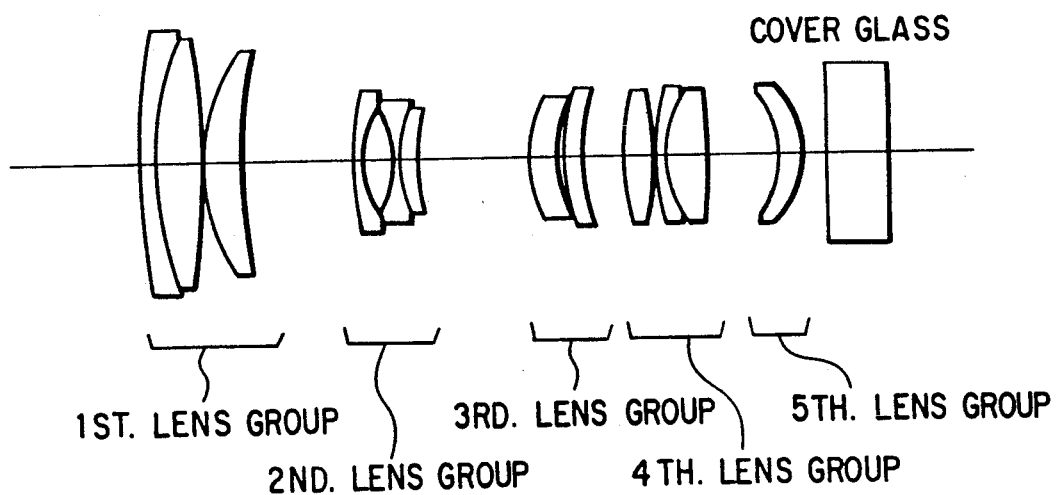
Figure 26:
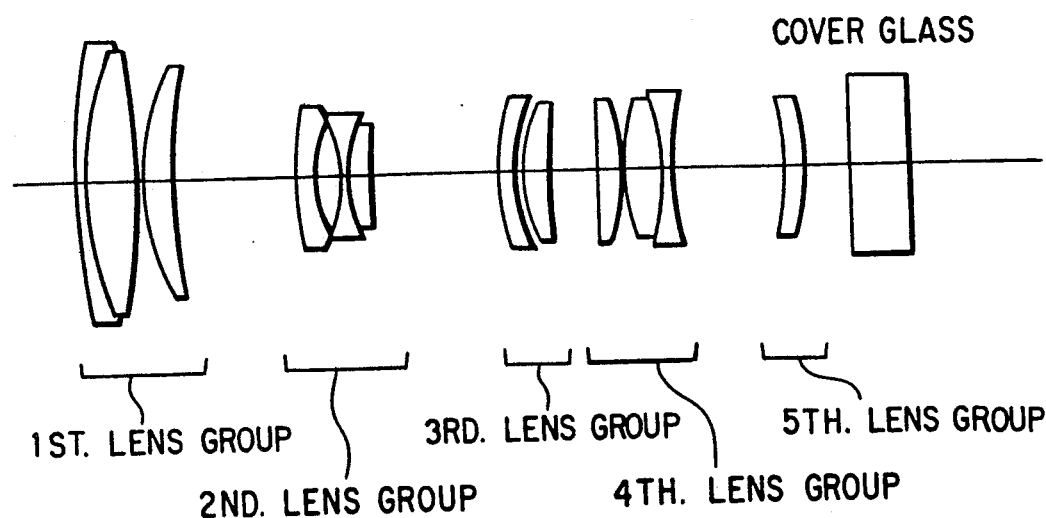
Figure 27:
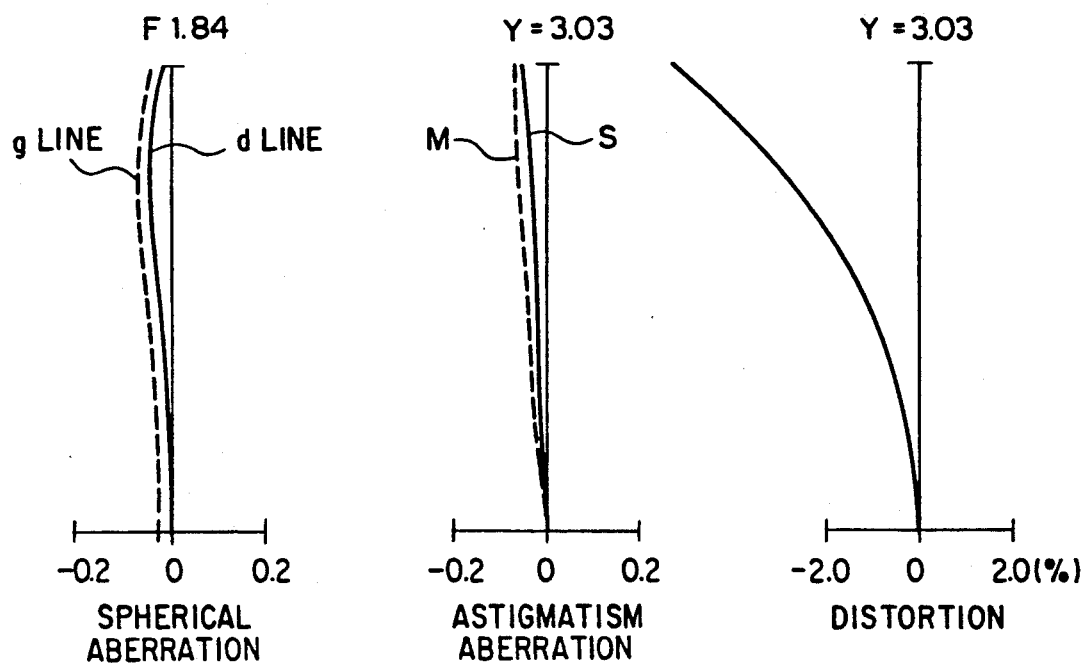
FIGS. 27-29 wide, middle, and telephoto position aberration diagrams of embodiment 9 of the zoom lens system of the present invention respectively.
Figure 28:
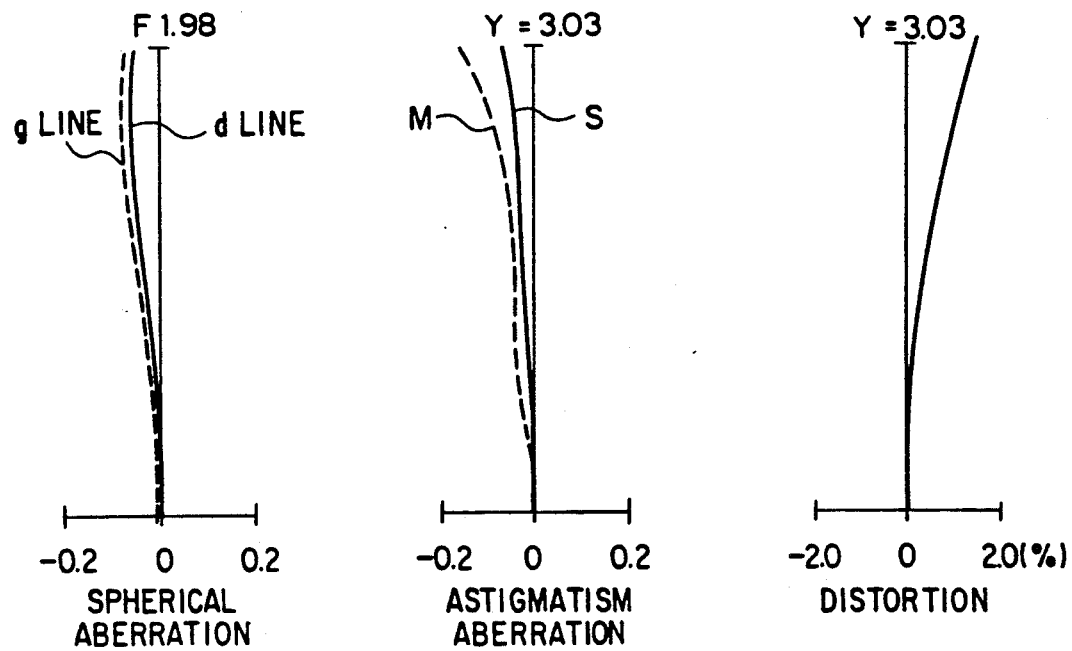
Figure 29:
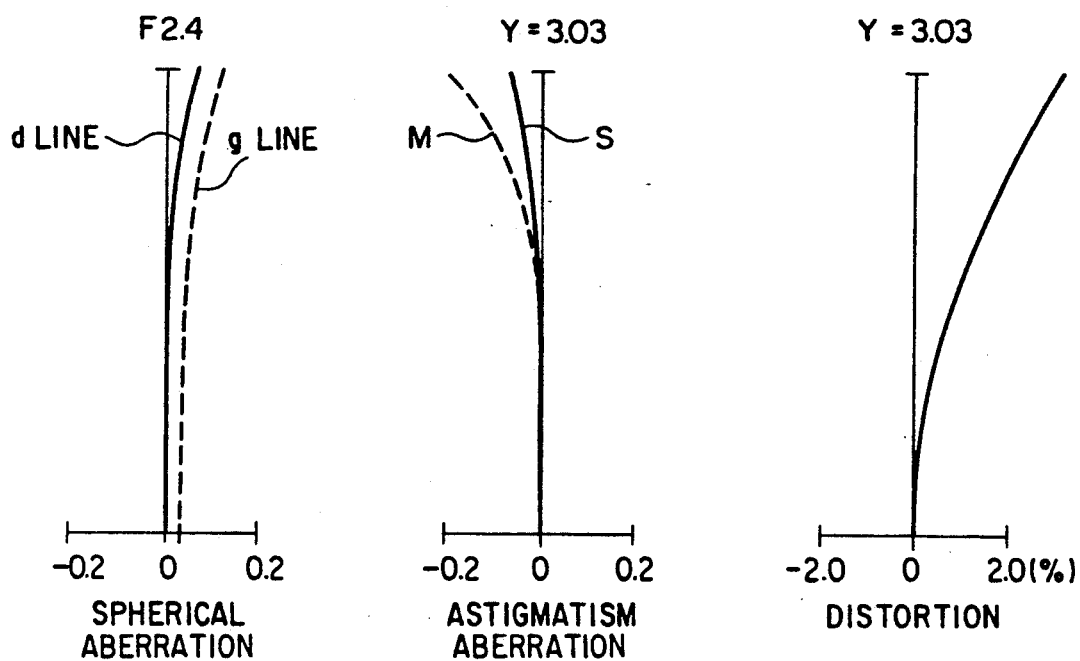
Figure 30:
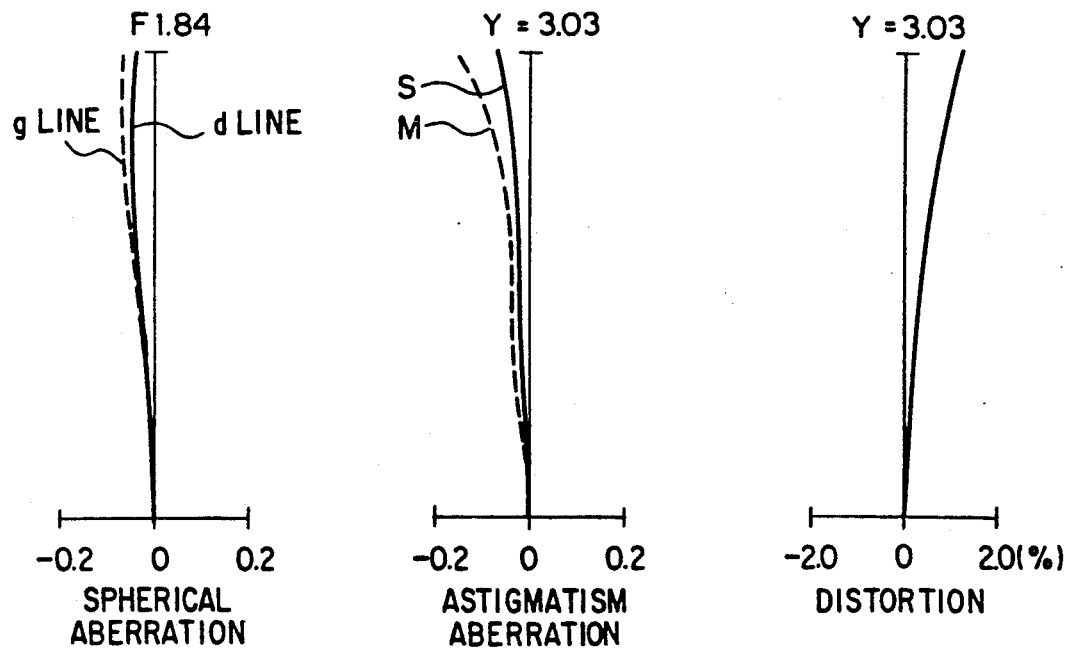
FIGS. 30-32 are wide, middle, and telephoto position aberration diagrams of embodiment 10 of the zoom lens system of the present invention, respectively.
Figure 31:
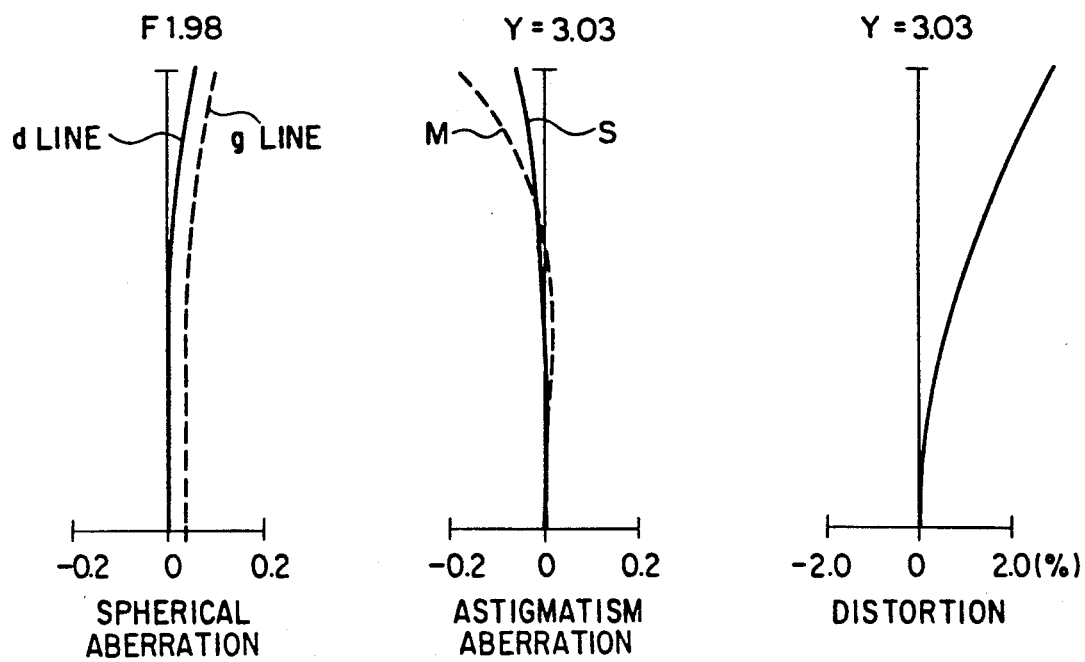
Figure 32:
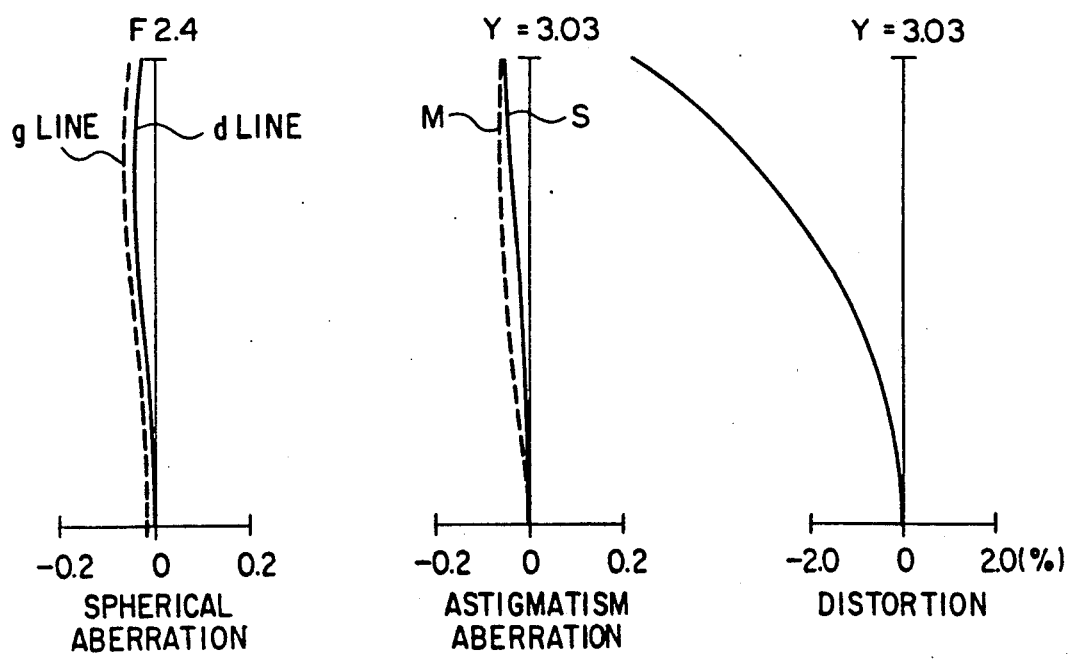
Figure 33:
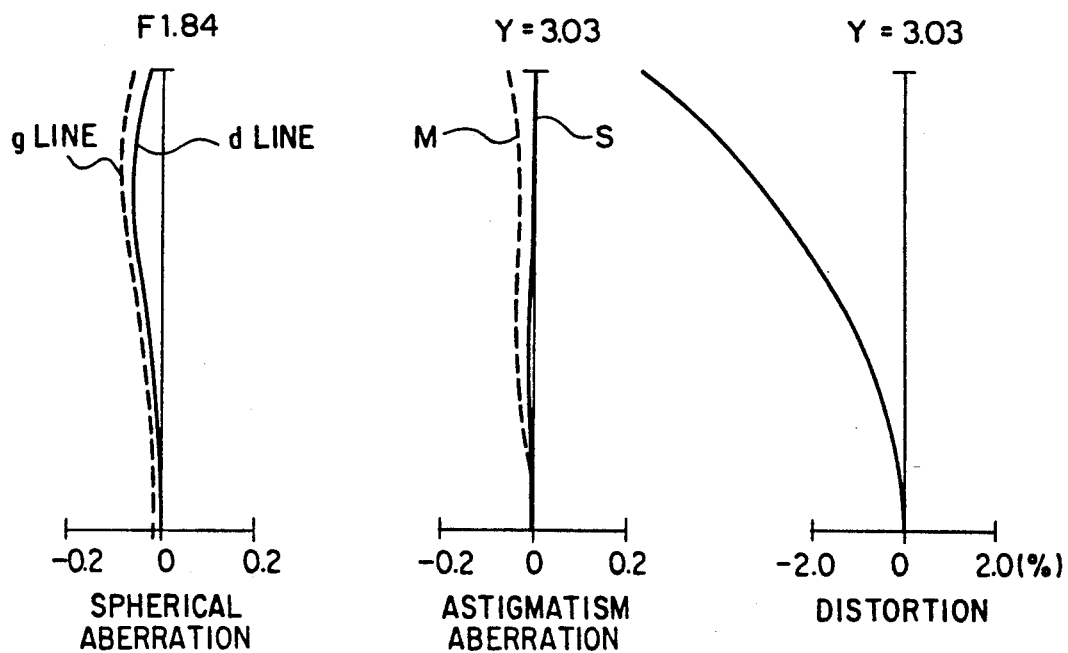
FIGS. 33-35 are wide, middle, and telephoto position aberration diagrams of embodiment 11 of the zoom lens system of the present invention, respectively.
Figure 34:
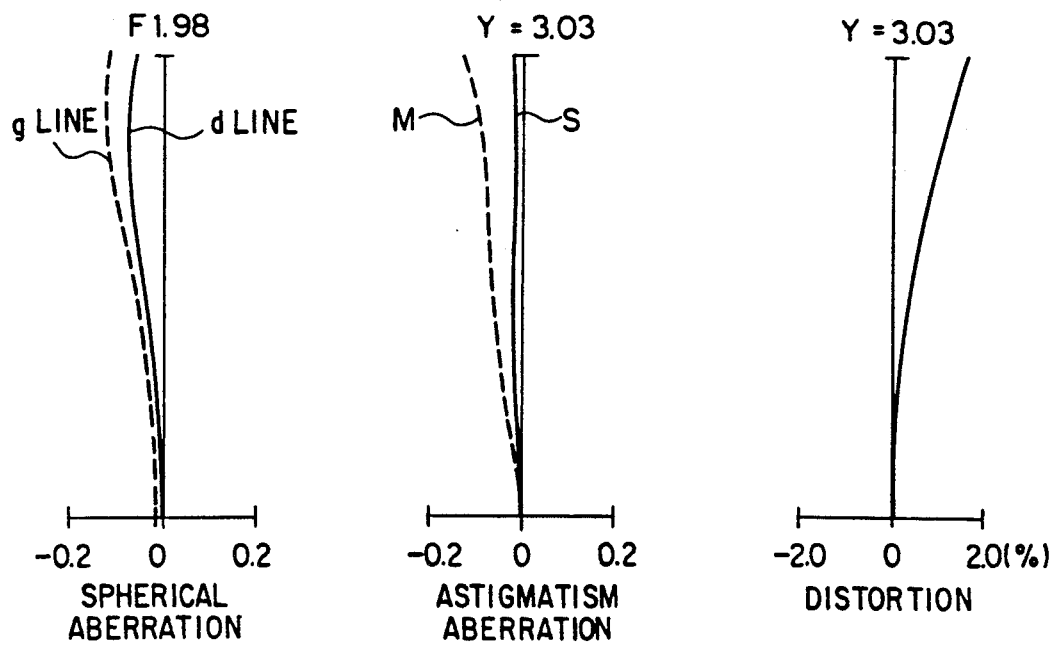
Figure 35:
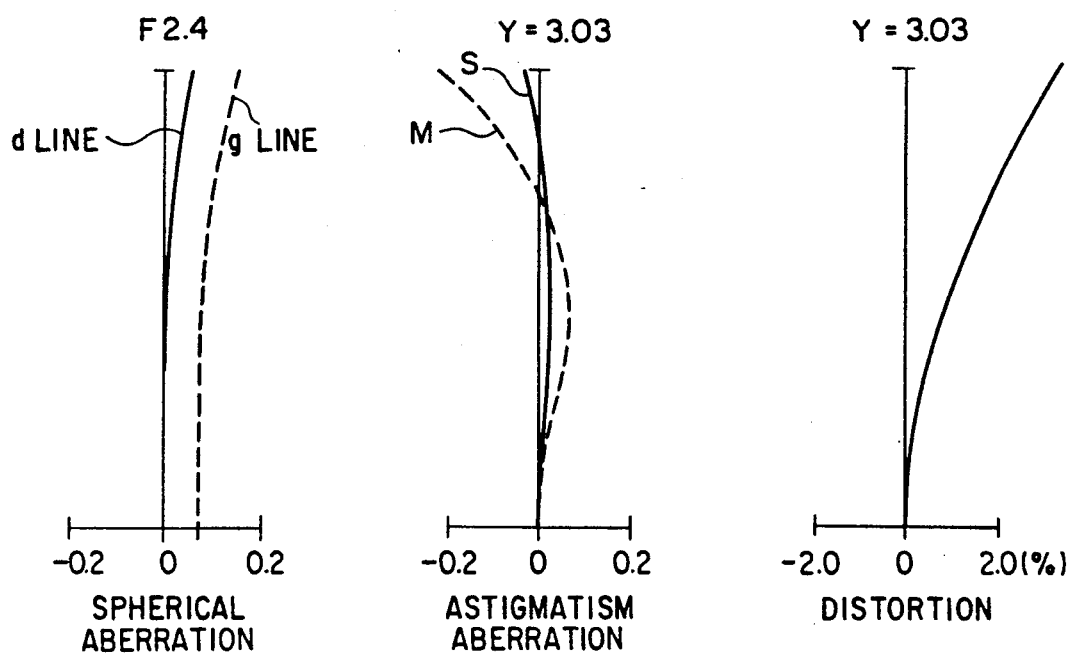
Figure 36:
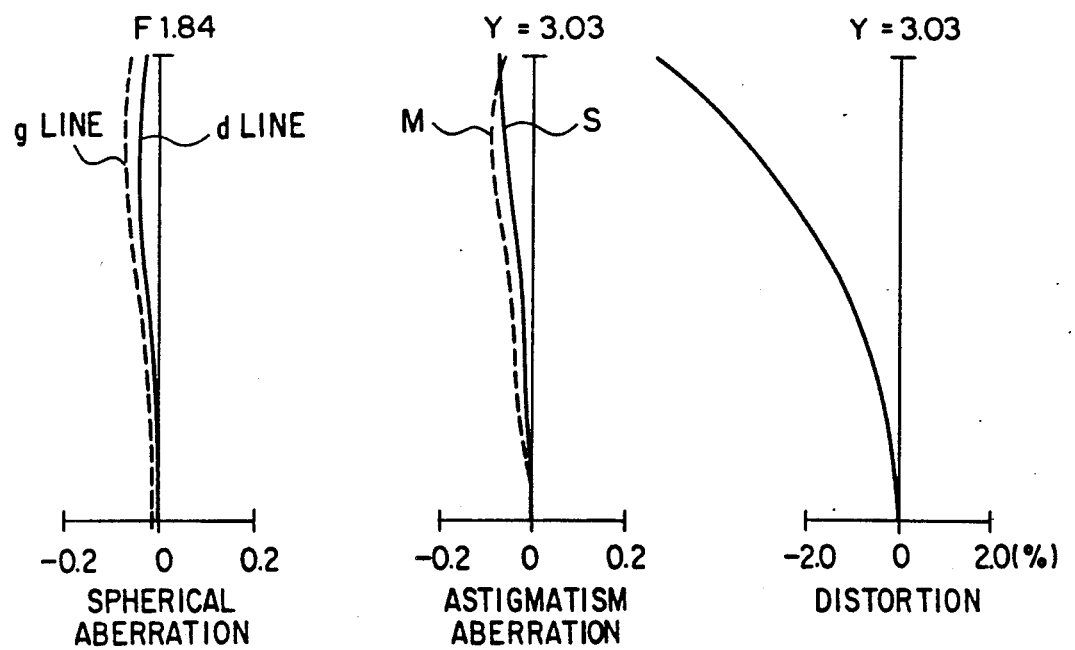
FIGS. 36-38 are wide, middle, and telephoto position aberration diagrams of embodiment 12 of the zoom lens system of the present invention, respectively.
Figure 37:
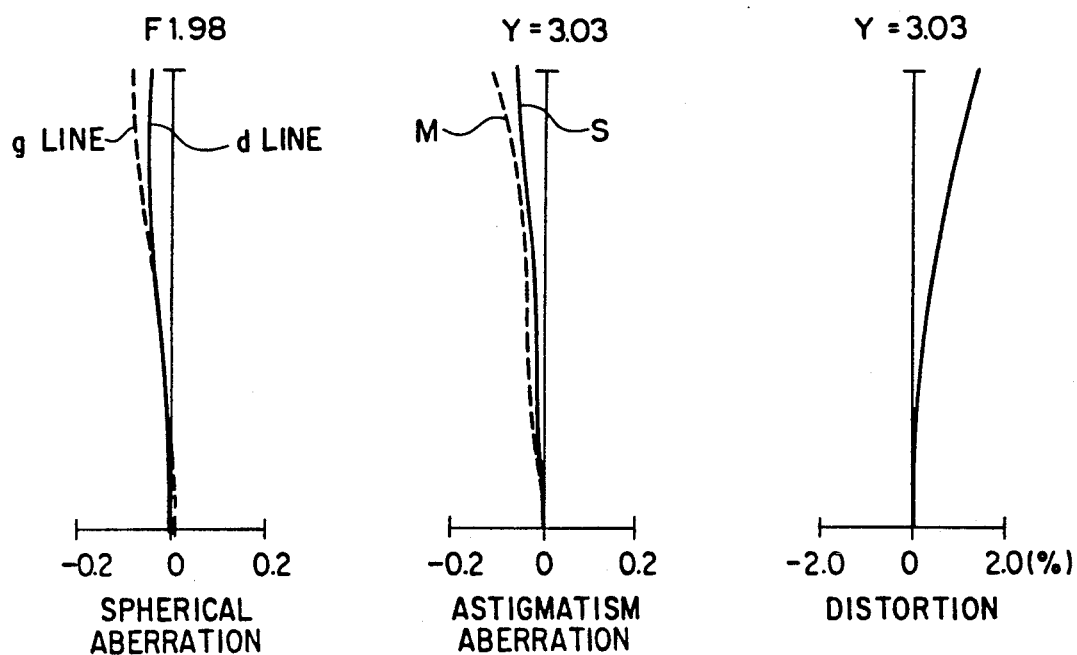
Figure 38:
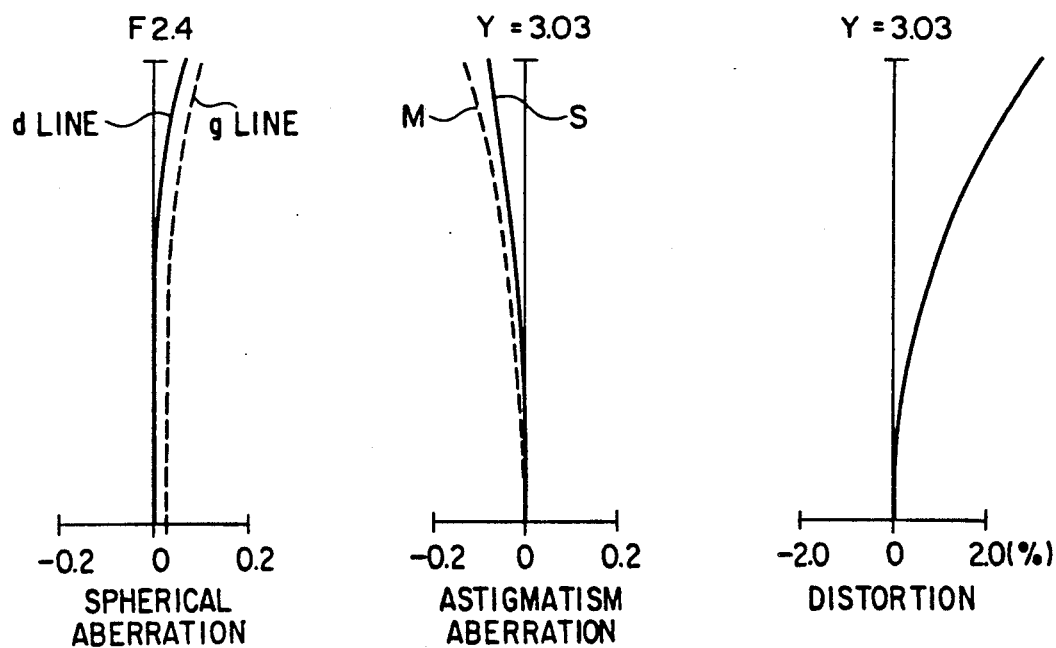
Figure 39:
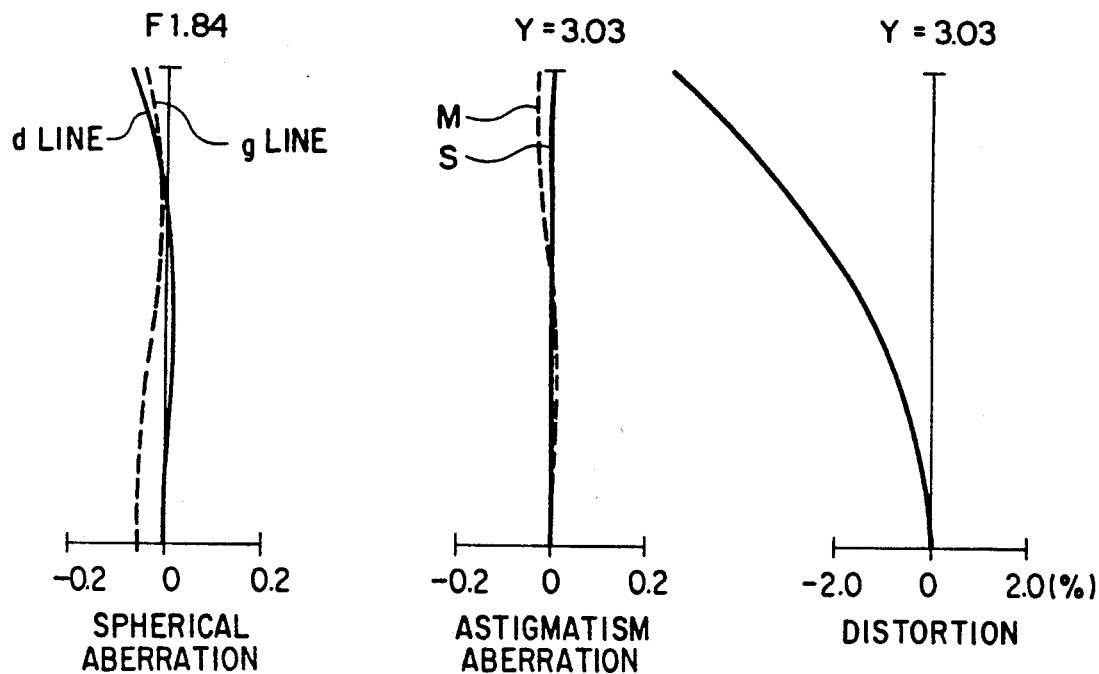
FIGS. 39-41 are wide, middle, and telephoto position aberration diagrams of embodiment 13 of the zoom lens system of the present invention, respectively.
Figure 40:
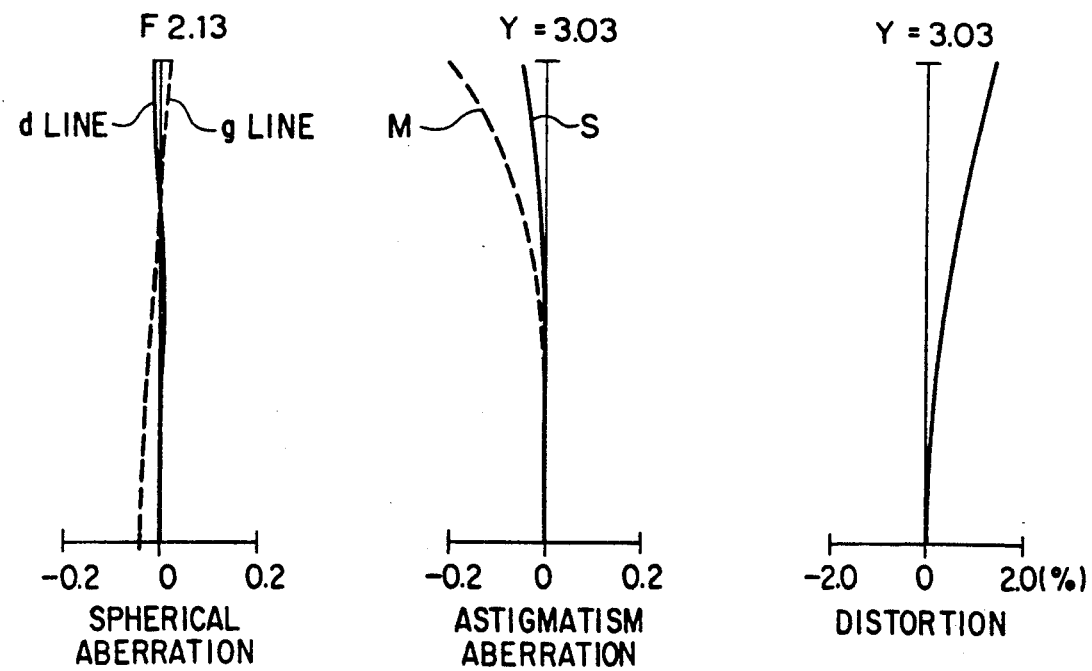
Figure 41:
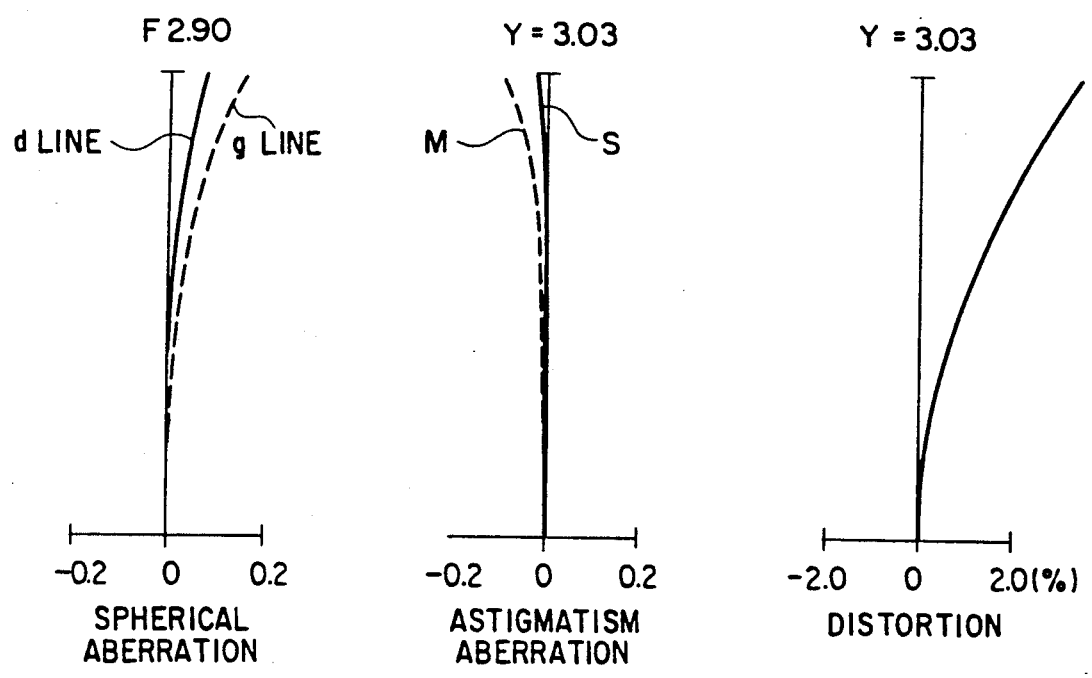

When no variable magnification instruction signal is detected and the AF control mode flag $F_M$ is in the wobbling mode for searching focusing direction, that is, $F_M = I$, and monitoring the focus signal intensity which is extracted from the video signal processing unit 18 via the focus signal detector 19, the calculation control unit 24 wobbles the lens component 4 back and forth so as to detect the increase direction of focus signal intensity as the in-focus direction by properly selected amount of wobbling movement depending on the focus signal intensity and on the selected state of the BP filter 19-2-i installed in the focus signal sensor 19. As shown in FIG. 5, for example, a focus signal $P_i$ at the focusing lens position of $Y_{i,j}$ is compared with a focus signal $P_{i+1}$ at the focusing lens position of $Y_{i,j+1}$ when the lens component 4 is moved toward the near side N by a certain amount of displacement $\alpha$. If $P_{i+1} \geq P_i + \Delta$, the control unit judges that the in-focus direction coincides with the trial movement $Y_{i,j+1}$ of the lens component 4 toward the near side, and the focusing lens control direction specification flag $F_D$ is set for driving the focusing lens component 4 toward the near side ($F_D \leftarrow N$), and the AF control mode flag $F_M$ is set to the mode II for detecting the peak of the focus point signal ($F_M \leftarrow II$).

A symbol $\Delta$ indicates an amount which is selected by the focus signal $P_i$, which is currently obtained, and by the spatial frequency band of the band pass filter, which is currently used, or by additional information (on the lens diaphragm diameter or on object brightness).

If $P_{i+1} \leq P_i + \Delta$, on the contrary, the control unit judges that the in-focus direction is against the trial movement of the lens component 4 toward the near side, and the focusing lens control direction specification flag $F_D$ is set for driving the focusing lens component 4 toward the infinite side ($F_D \leftarrow F$), and the AF control mode flag $F_M$ is set to the mode II for detecting the peak of the focal point signal ($F_M \leftarrow II$). Then, the control unit drives the focusing lens component 4 toward the above determined direction until the increase of the focus signal is stopped.

When neither $P_{i+1} \geq P_i + \Delta$ nor $P_{i+1} \geq P_i + \Delta$ is held, i.e., no significant change is detected by the trial movement, at this position it is judged that the focusing lens is focused, and the focusing lens is stopped, and driving flag $F_D$ is renewed to search mode ($F_D \leftarrow I$). If no significant change is recognized in $P_i$ having non trivial value when the AF control mode flag FM is set to the search mode II and the focusing lens component 4 is wobbled by a certain amount of displacement $\alpha$, that is, $|P_{j+1} - P_j| < \Delta$, it is judged that the system is at the peak shown in FIG. 5, that is, in the focusing state, but if $P_i$ and $P_{i+1}$ is extremely low, the system is in the extremely low contrast state in which $P_{j \pm 1} \leq \Delta$, $P_j \leq \Delta$. In both cases the system is not in a state in which the focusing lens is moved. Then, to continue the detection of the in-focus direction further, $F_D$ is set to I and the system goes to the next processing without $F_M$ being updated.

Figure 2:
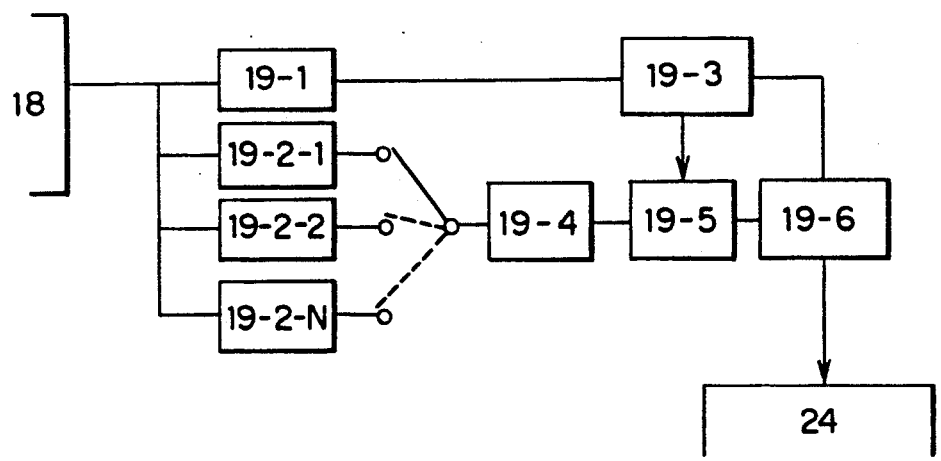
FIG. 2 is a block diagram of a focal point signal detection circuit, FIGS. 3($a$) through 3($d$) present a flow chart of various controls.

As mentioned above, in this example system a symbol is used to judge not only focusing and non-focusing but also low contrast, and different values are also usable. In FIG. 2, numeral 19-1 indicates a timing circuit, 19-2-1 to 19-2-N indicate filters for extracting special frequency band signals from video signals, 19-4 indicates a rectifier circuit, 19-5 an integrating circuit, and 19-6 indicates an interface circuit for sending a focus signal to the calculation control unit.

In the afore-mentioned system, composition of four lens components composed of the first through the fourth lens components has been described. As the similar function can be achieved by another composition in which a fixed fifth lens component is placed behind the composition of four lens components, this composition is also within the scope of the present invention.

Another characteristic of this system is that since table information $(X_iY_{ij})$ corresponding to the object distance U and the focal length f is stored in the calculation control unit, the following useful information can be displayed or the lens status can be preset.

(1) Display of the object distance and focal length $(X_i, Y_{i,j})$ curves are stored in the display calculation control unit, and $X_i$ is a numeral which has a one-to-one correspondence with the zooming focal length and j is a numeral which has a one-to-one correspondence with the object distance. Those numerals can be used to preview the focal length or object distance in detail. A display means like liquid crystal mounted on the outer surface of lens barrel or character generator on the CRT display, can display the selected focal length or object distance when a signal is sent from the calculation control unit, to the display means.

(2) Presetting the focal length, object distance, and magnification.

By specifying $X_i$ or j for the calculation control unit using a numerical signal from an input means like ten keys or up-down keys of the camera which is not shown in the figure, a desired focal length or object distance can be set. Furthermore, the zooming range can be specified optionally or restricted depending on the user's camera handling technique level or picture making intention.

It is also easily achievable by combining automatic function with this presetting function to maintain the magnification ratio constant. When a portrati or an actual magnification value, is instructed by the user, for example, and its information is sent to the calculation control unit, the zooming and focusing are controlled together so that a desired magnification is automatically obtained. This function is most suited to not only outdoor imaging but also applications for imaging documents or still life on the screen at a fixed ratio specified by the user (for example, as images for printed papers).

As a modification of the above embodiment, a zooming lens apparatus with a better operation feeling wherein the zoom and focus switches are dials or rings with an encoder whose rotational direction is incremental instead of simple seesaw switches and output signals by operating the switches are supplied to the calculation control unit, can be realized.

Another modification is a zooming lens apparatus with an operation feeling and appearance which are the same as those of conventional front focus or mechanical zooming lens systems, wherein rotation rings with an encoder indicating the absolute value of each rotational angle are used instead of zoom and focus switches, and the focal length and object distance are displayed on the rings.

Another drive means, in which the drive means for the variable magnification lens component 2 and the focusing lens component 4 are piezo actuators, particularly those of inch worm like motion or ultrasonic motor, instead of stepping motors, can be used.

A further modified drive means, in which the drive means is a DC motor which generates an incremental pulse as the lens group moves, the memories MX and MY are rewritten by the generated pulse, and the drive means is controlled by a comparison with the $(X_i, Y_{i,j})$ table, can be used.

Furthermore, it is possible to achieve the initialization of each lens component by using simple mechanical lock end instead of using photo-interrupter. Furthermore, another object distance detection means instead of using video signals is applicable; for example, a passive range finding system to use the parallax or phase difference between two images of an object on the pair of linear image sensors placed behind a pair of objective lenses mutually separated by a predetermined base length, in which the spacing of two images is determined trigonometricaly by the object distance, the base length and focal length of the lenses, or a infrared active range finder to emit infrared light and to receive the reflecting light through the lens separated from the emitting optical axis by a base length and to detect the object distance by the displacement of the image spot from the base length.

Some of the embodiments 2 to 8 described hereunder use plastic lenses as indicated by a * mark is put. Plastic lenses generally vary in the refractive index with changes in the environmental temperature. In the embodiments of the present invention, changes in the focal point caused by changes in the refractive index are controlled by a most suitable combination of the refractive indexes of the plastic lenses. Materials of plastic lenses are polycarbonate (PC) and polymethyl methacrylate (PMMA). The refractive indexes of those plastics change almost linearly with temperature. Data is as follows:

|  | PC | PMMA |
|---|---|---|
| Reference refractive index (20° C.) | 1.583 | 1.492 |
| Refractive index (50° C.) | 1.5788 | 1.4884 |

The definition of aspheric coefficient in the embodiments 2 to 8 is as follows:

$$x = \frac{Ch^2}{1 + \sqrt{1 - (K+1)C^2h^2}} + A_4h^4 + A_6h^6 + A_8h^8 + \ldots$$

where:
- x: A coordinate from the object side to the image side along the optics axis on the assumption that the peak of the aspheric surface is a zero point;
- h: A coordinate perpendicular to the optics axis on the assumption that the peak of the aspheric surface is a zero point;
- c: Paraxial curvature of the aspheric surface.

A symbol R in the table indicates a radius of curvature of each refractive surface, D a refractive surface interval, N an refractive index of the lens material, $v_d$ an Abbe number of the lens material, f a focal length of the entire lens system, $2\delta$ a view angle, F a F-number, and $f_B$ a back focal length.

Embodiment 2 f = 7.20~40.34    F: 1.64~2.50
$2\omega$ = 51.46°~9.06°    $f_B$ = 2.0

|  |  | R | D | N | vd |
|---|---|---|---|---|---|
| 1 | 1st lens component | 46.160 | 0.80 | 1.80518 | 25.4 |
| 2 |  | 20.559 | 3.80 | 1.51633 | 64.1 |
| 3 |  | −52.078 | 0.20 |  |  |
| 4 |  | 14.969 | 2.00 | 1.62299 | 58.2 |
| 5 |  | 29.888 | a |  |  |
| 6 | 2nd lens component | 17.371 | 0.65 | 1.77250 | 49.6 |
| 7 |  | 6.936 | 2.50 |  |  |
| 8 |  | −9.693 | 0.60 | 1.69680 | 55.5 |
| 9 |  | 9.693 | 1.70 | 1.84666 | 23.9 |
| 10 |  | −731.264 | b |  |  |
| 11 | 3rd lens component | 12.034 | 1.80 | 1.69680 | 55.5 |
| 12 |  | 26.827 | c |  |  |
| 13 |  | −2254.231 | 1.80 | 1.62299 | 58.2 |
| 14 | 4th lens component | −17.613 | 0.53 |  |  |
| 15 |  | 23.171 | 0.77 | 1.84666 | 23.9 |
| 16 |  | 8.105 | 3.10 | 1.69680 | 55.5 |
| 17 |  | −45.839 | d |  |  |
| 18 | 5th lens component | −50.000 | 1.80 | 1.49200 | 57.0 |
| 19 |  | −42.434 | 1.64 |  |  |
| 20 | Cover glass | ∞ | 4.00 | 1.51633 | 64.1 |
| 21 |  | ∞ |  |  |  |

11th aspheric coefficient    clear aperture radius 4.9
K = 1.74360
$A_4 = -4.58301 \times 10^{-5}$
$A_6 = 8.89371 \times 10^{-8}$
$A_8 = -5.39137 \times 10^{-9}$
$A_{10} = 1.23221 \times 10^{-10}$ 18th aspheric coefficient    clear aperture radius 4.4
K = 4.00867
$A_4 = -7.82756 \times 10^{-5}$
$A_6 = 4.95936 \times 10^{-7}$
$A_8 = -2.91924 \times 10^{-8}$
$A_{10} = 2.94816 \times 10^{-10}$

| f | a | b | c | d |
|---|---|---|---|---|
| 7.20 | 1.0 | 16.4 | 4.435 | 5.482 |
| 23.44 | 11.2 | 6.2 | 3.576 | 6.341 |
| 40.34 | 15.4 | 2.0 | 7.929 | 1.988 |

$f_1 = 28.557$    $f_2 = -7.846$    $f_3 = 29.831$
$f_4 = 15.069$    $f_5 = 528.508$

Embodiment 3 f = 8.80~49.98    F: 2.00~2.60
$2\omega$ = 54.66°~9.26°    $f_B$ = 1.8

|  |  | R | D | N | vd |
|---|---|---|---|---|---|
| 1 | 1st lens component | 61.672 | 0.90 | 1.80518 | 25.4 |
| 2 |  | 23.949 | 4.30 | 1.51633 | 64.1 |
| 3 |  | −67.117 | 0.20 |  |  |
| 4 |  | 17.947 | 3.10 | 1.62299 | 58.2 |
| 5 |  | 60.033 | a |  |  |
| 6 | 2nd lens component | 29.558 | 0.70 | 1.72000 | 43.7 |
| 7 |  | 7.850 | 2.80 |  |  |
| 8 |  | −10.410 | 0.70 | 1.69680 | 55.5 |
| 9 |  | 12.386 | 1.80 | 1.84666 | 23.9 |
| 10 |  | −98.185 | b |  |  |
| 11 | 3rd lens component | 21.070 | 1.80 | 1.69680 | 55.5 |
| 12 |  | 219.381 | c |  |  |
| 13 | 4th lens component | 90.216 | 1.70 | 1.62299 | 58.2 |
| 14 |  | −33.260 | 0.20 |  |  |
| 15 |  | 36.082 | 0.95 | 1.84666 | 23.9 |
| 16 |  | 11.158 | 3.80 | 1.69680 | 55.5 |
| 17 |  | −35.044 | d |  |  |
| 18 | 5th lens component | −50.000 | 0.80 | 1.58300 | 30.0 |
| 19 |  | −46.872 | 2.00 |  |  |
| 20 | Cover glass | ∞ | 4.73 | 1.51633 | 64.1 |
| 21 |  | ∞ |  |  |  |

11th aspheric coefficient    clear aperture radius 5.0
K = −1.30254
$A_4 = -5.25830 \times 10^{-5}$
$A_6 = 7.61840 \times 10^{-8}$
$A_8 = -5.39289 \times 10^{-9}$
$A_{10} = 1.23222 \times 10^{-10}$ 18th aspheric coefficient    clear aperture radius 5.0
K = 3.82172
$A_4 = -4.80343 \times 10^{-5}$
$A_6 = 1.81638 \times 10^{-7}$
$A_8 = -7.15364 \times 10^{-9}$
$A_{10} = 4.83428 \times 10^{-11}$ Variable interval

| f | a | b | c | d |
|---|---|---|---|---|
| 8.80 | 1.035 | 17.50 | 7.014 | 9.200 |
| 27.07 | 11.360 | 7.175 | 6.209 | 10.005 |
| 49.98 | 15.810 | 2.725 | 12.229 | 3.985 |

$f_1 = 29.756$    $f_2 = -8.441$    $f_3 = 33.327$
$f_4 = 18.763$    $f_5 = 1174.352$

Embodiment 4 f = 9.27~52.74    F: 1.44~1.98
$2\omega$ = 49.2°~8.5°    $f_B$ = 4.78

-continued

|   |   | R | D | N | νd |
|---|---|---|---|---|---|
| 1 | 1st lens component | 92.910 | 1.10 | 1.80518 | 25.4 |
| 2 | | 37.435 | 5.30 | 1.51633 | 61.4 |
| 3 | | −83.892 | 0.20 | | |
| 4 | | 29.791 | 3.00 | 1.60311 | 60.7 |
| 5 | | 89.158 | a | | |
| 6 | 2nd lens component | 50.000 | 0.70 | 1.71300 | 49.6 |
| 7 | | 11.900 | 3.70 | | |
| 8 | | −15.467 | 0.70 | 1.69680 | 55.5 |
| 9 | | 17.625 | 2.20 | 1.84666 | 23.9 |
| 10 | | −147.259 | b | | |
| 11 | 3rd lens component | 62.009 | 3.60 | 1.69680 | 55.5 |
| 12 | | −20.512 | 1.30 | | |
| 13 | | −15.057 | 1.50 | 1.58300 | 30.0 |
| 14 | | −32.146 | c | | |
| 15 | 4th lens component | −83.553 | 1.40 | 1.58300 | 30.0 |
| 16 | | 17.329 | 0.50 | | |
| 17 | | 18.730 | 5.50 | 1.48749 | 70.2 |
| 18 | | −19.298 | 0.20 | | |
| 19 | | 19.710 | 4.00 | 1.49200 | 57.0 |
| 20 | | −72.807 | d | | |
| 21 | 5th lens component | −40.000 | 2.00 | 1.58300 | 30.0 |
| 22 | | −38.124 | 6.89 | | |
| 23 | Cover glass | ∞ | 6.20 | 1.51633 | 61.4 |
| 24 | | ∞ | | | |

19th aspheric coefficient     clear aperture radius 8.1
$K = -6.70206 \times 10^{-1}$
$A_4 = 0.0$
$A_6 = 0.0$
$A_8 = 0.0$
$A_{10} = 0.0$ 21st aspheric coefficient     clear aperture factor 7.5
$K = 2.05496 \times 10^{-1}$
$A_4 = 0.0$
$A_6 = 0.0$
$A_8 = 0.0$
$A_{10} = 0.0$

| f | a | b | c | d |
|---|---|---|---|---|
| 9.27 | 1.100 | 25.600 | 16.527 | 2.000 |
| 19.54 | 14.000 | 12.700 | 14.287 | 4.240 |
| 52.74 | 25.700 | 1.000 | 16.527 | 2.000 |

$f_1 = 48.127$    $f_2 = -12.514$    $f_3 = 39.460$
$f_4 = 21.482$    $f_5 = 1001.016$

The condition values of the above embodiments are as follows:

|  | Embodiment 2 | Embodiment 3 | Embodiment 4 |
|---|---|---|---|
| $\|f_2\|F_W/(f_WZ)$ | 0.319 | 0.338 | 0.342 |
| $f_4/f_W$ | 2.09 | 2.13 | 2.32 |
| $f_W \Sigma \Delta_i / f_W$ | 0.0122 | 0.0136 | 0.0084 |
| $\nu_{2-} - \nu_{2+}$ | 28.65 | 25.7 | 28.65 |
| $n_3 \sqrt{F_W}$ | 2.173 | 2.400 | 2.036 |

Embodiment 5

$f = 7.20 \sim 40.99$     F: $1.64 \sim 2.40$
$2\omega = 51.4° \sim 8.84°$     $f_B = 2.0$

|   |   | R | D | N | νd |
|---|---|---|---|---|---|
| 1 | 1st lens component | 36.672 | 0.80 | 1.80518 | 25.4 |
| 2 | | 18.789 | 3.80 | 1.51633 | 64.1 |
| 3 | | −52.851 | 0.20 | | |
| 4 | | 14.502 | 2.00 | 1.62299 | 58.2 |
| 5 | | 23.419 | a | | |
| 6 | 2nd lens component | 18.367 | 0.65 | 1.77250 | 49.6 |
| 7 | | 7.407 | 2.50 | | |
| 8 | | −10.460 | 0.60 | 1.69680 | 55.5 |
| 9 | | 10.460 | 1.70 | 1.84666 | 23.9 |
| 10 | | 174.263 | b | | |
| 11 | 3rd lens component | 13.897 | 1.80 | 1.69680 | 55.5 |
| 12 | | 38.897 | c | | |
| 13 | 4th lens component | 250.208 | 1.80 | 1.62299 | 58.2 |
| 14 | | −19.212 | 0.53 | | |
| 15 | | 19.084 | 0.77 | 1.84666 | 23.9 |
| 16 | | 7.895 | 3.10 | 1.69680 | 55.5 |
| 17 | | −73.283 | d | | |
| 18 | 5th lens component | 50.000 | 1.80 | 1.49200 | 57.0* |
| 19 | | 41.439 | 1.64 | | |
| 20 | Cover glass | ∞ | 4.00 | 1.51633 | 64.1 |
| 21 | | ∞ | | | |

11th aspheric coefficient     clear aperture radius 4.7
$K = -1.94404$
$A_4 = -4.57908 \times 10^{-5}$
$A_6 = 8.90194 \times 10^{-8}$
$A_8 = -5.39124 \times 10^{-9}$
$A_{10} = 1.23222 \times 10^{-10}$ 18th aspheric coefficient     clear aperture radius 4.3
$K = -3.11174 \times 10$
$A_4 = -7.81744 \times 10^{-5}$
$A_6 = 4.95831 \times 10^{-7}$
$A_8 = -2.91924 \times 10^{-8}$
$A_{10} = 2.94816 \times 10^{-10}$ Variable interval

| f | a | b | c | d |
|---|---|---|---|---|
| 7.20 | 1.0 | 16.4 | 5.24 | 4.67 |
| 23.04 | 11.2 | 6.2 | 4.45 | 5.46 |
| 40.99 | 15.4 | 2.0 | 8.42 | 1.49 |

$f_1 = 29.404$    $f_2 = -7.960$    $f_3 = 30.138$
$f_4 = 14.654$    $f_5 = -528.527$

Embodiment 6

$f = 8.80 \sim 49.98$     F: $2.0 \sim 2.6$
$2\omega = 51.54° \sim 8.86°$     $f_B = 1.80$

|   |   | R | D | N | νd |
|---|---|---|---|---|---|
| 1 | 1st lens component | 60.663 | 0.90 | 1.80518 | 25.4 |
| 2 | | 23.831 | 4.80 | 1.51633 | 64.1 |
| 3 | | −73.936 | 0.20 | | |
| 4 | | 18.418 | 3.00 | 1.62299 | 58.2 |
| 5 | | 68.741 | a | | |
| 6 | 2nd lens component | 28.334 | 0.70 | 1.72000 | 43.7 |
| 7 | | 7.873 | 2.80 | | |
| 8 | | −10.728 | 0.70 | 1.69680 | 55.5 |
| 9 | | 11.905 | 1.70 | 1.84666 | 23.9 |
| 10 | | −249.990 | b | | |
| 11 | 3rd lens component | 15.067 | 1.80 | 1.69680 | 55.5 |
| 12 | | 43.655 | c | | |
| 13 | 4th lens component | 44.862 | 2.40 | 1.62299 | 58.2 |
| 14 | | −19.299 | 0.65 | | |
| 15 | | 41.488 | 0.95 | 1.84666 | 23.9 |
| 16 | | 10.598 | 3.70 | 1.69680 | 55.5 |
| 17 | | −88.505 | d | | |
| 18 | 5th lens component | −32.902 | 1.50 | 1.51633 | 64.1 |
| 19 | | −150.498 | 2.00 | | |
| 20 | Cover glass | ∞ | 4.73 | 1.51633 | 64.1 |
| 21 | | ∞ | | | |

11th aspheric coefficient     clear aperture radius 5.0
$K = -1.07994$
$A_4 = -4.49364 \times 10^{-5}$
$A_6 = 9.15906 \times 10^{-8}$
$A_8 = -5.38924 \times 10^{-9}$
$A_{10} = 1.23222 \times 10^{-10}$ 18th aspheric coefficient     clear aperture radius 6.0
$K = -3.58728 \times 10$
$A_4 = -5.38150 \times 10^{-6}$
$A_6 = -1.59535 \times 10^{-7}$
$A_8 = -4.29237 \times 10^{-9}$
$A_{10} = 3.53996 \times 10^{-11}$ Variable interval

| f | a | b | c | d |
|---|---|---|---|---|
| 8.80 | 1.0354 | 17.50 | 8.5150 | 6.6236 |
| 26.95 | 11.3604 | 7.175 | 7.3787 | 7.7599 |
| 49.98 | 15.8099 | 2.7255 | 11.9425 | 3.1961 |

$f_1 = 30.031$    $f_2 = -8.253$    $f_3 = 32.186$
$f_4 = 17.166$    $f_5 = -81.908$

Embodiment 7

$f = 8.80 \sim 50.00$     F: $2.0 \sim 2.6$
$2\omega = 54.66° \sim 9.40°$     $f_B = 1.80$

|   |   | R | D | N | νd |
|---|---|---|---|---|---|
| 1 | 1st lens component | 65.958 | 0.90 | 1.80518 | 25.4 |
| 2 | | 24.340 | 4.80 | 1.51633 | 64.1 |
| 3 | | −57.064 | 0.20 | | |
| 4 | | 17.374 | 3.00 | 1.62299 | 58.2 |
| 5 | | 48.892 | a | | |
| 6 | | 28.254 | 0.70 | 1.72000 | 43.7 |

-continued

| | | | | | |
|---|---|---|---|---|---|
| 7 | 2nd lens component | 7.653 | 2.80 | | |
| 8 | | −10.038 | 0.70 | 1.69680 | 55.5 |
| 9 | | 12.536 | 1.70 | 1.84666 | 23.9 |
| 10 | | −87.629 | b | | |
| 11 | 3rd lens component | 19.535 | 1.80 | 1.69680 | 55.5 |
| 12 | | 132.663 | c | | |
| 13 | 4th lens component | −133.448 | 2.40 | 1.62290 | 58.2 |
| 14 | | −21.333 | 0.65 | | |
| 15 | | 24.868 | 0.95 | 1.84666 | 23.9 |
| 16 | | 9.646 | 3.70 | 1.69680 | 55.5 |
| 17 | | −44.060 | d | | |
| 18 | | −50.791 | 1.50 | 1.51633 | 64.1 |
| 19 | | 184.111 | 2.00 | | |
| 20 | Cover glass | ∞ | 4.73 | 1.51633 | 64.1 |
| 21 | | ∞ | | | |

11th aspheric coefficient — clear aperture radius 5.0
$K = -2.11982$
$A_4 = -4.49777 \times 10^{-5}$
$A_6 = 9.14945 \times 10^{-8}$
$A_8 = -5.38926 \times 10^{-9}$
$A_{10} = 1.23222 \times 10^{-10}$ 18th aspheric coefficient — clear aperture radius 5.0
$K = 1.33922 \times 10$
$A_4 = -4.18551 \times 10^{-5}$
$A_6 = 1.81397 \times 10^{-7}$
$A_8 = -7.15397 \times 10^{-9}$
$A_{10} = 4.83427 \times 10^{-11}$ Variable interval

| f | a | b | c | d |
|---|---|---|---|---|
| 8.80 | 1.0354 | 17.50 | 7.2151 | 7.9296 |
| 27.01 | 11.3604 | 7.175 | 6.0712 | 9.0735 |
| 50.00 | 15.8099 | 2.7255 | 10.6739 | 4.4708 |

$f_1 = 29.982 \quad f_2 = -8.234 \quad f_3 = 32.662$
$f_4 = 17.471 \quad f_5 = -76.932$ Embodiment 8
$f = 9.27 \sim 52.80 \quad F: 1.44 \sim 1.98$
$2\omega = 49.2° \sim 8.4° \quad f_B = 4.78$

| | | R | D | N | νd |
|---|---|---|---|---|---|
| 1 | 1st lens component | 93.930 | 1.10 | 1.80518 | 25.4 |
| 2 | | 37.243 | 5.30 | 1.51633 | 61.4 |
| 3 | | −81.993 | 0.20 | | |
| 4 | | 29.427 | 3.00 | 1.60311 | 60.7 |
| 5 | | 85.743 | a | | |
| 6 | 2nd lens component | 48.485 | 0.70 | 1.71300 | 49.6 |
| 7 | | 11.768 | 3.70 | | |
| 8 | | −15.350 | 0.70 | 1.69680 | 55.5 |
| 9 | | 17.516 | 2.20 | 1.84666 | 23.9 |
| 10 | | −137.397 | b | | |
| 11 | 3rd lens component | 64.443 | 3.60 | 1.69680 | 55.5 |
| 12 | | −20.969 | 1.30 | | |
| 13 | | −15.144 | 1.50 | 1.58300 | 30.0* |
| 14 | | −30.549 | c | | |
| 15 | 4th lens component | −87.027 | 1.40 | 1.58300 | 30.0* |
| 16 | | 17.154 | 0.50 | | |
| 17 | | 18.594 | 5.50 | 1.48749 | 70.2 |
| 18 | | −19.521 | 0.20 | | |
| 19 | | 19.881 | 4.00 | 1.49200 | 57.0* |
| 20 | | −58.260 | d | | |
| 21 | 5th lens component | −40.000 | 2.00 | 1.58300 | 30.0* |
| 22 | | 42.928 | 6.70 | | |
| 21 | Cover glass | ∞ | 6.20 | 1.51633 | 61.4 |
| 23 | | ∞ | | | |

19th aspheric coefficient — clear aperture radius 8.3
$K = -7.58103 \times 10^{-1}$
$A_4 = 0.0$
$A_6 = 0.0$
$A_8 = 0.0$
$A_{10} = 0.0$ 21th aspheric coefficient — clear aperture radius 7.6
$K = -1.69524$
$A_4 = 0.0$
$A_6 = 0.0$
$A_8 = 0.0$
$A_{10} = 0.0$ -continued Variable interval

| f | a | b | c | d |
|---|---|---|---|---|
| 9.27 | 1.100 | 25.600 | 8.029 | 1.185 |
| 19.50 | 14.000 | 12.700 | 5.929 | 3.300 |
| 52.80 | 25.700 | 1.000 | 8.050 | 11.692 |

$f_1 = 48.09 \quad f_2 = -12.51 \quad f_3 = 39.58$
$f_4 = 20.94 \quad f_5 = -1344.01$ The values of the above embodiments are as follows:

| | Embodiment 5 | Embodiment 6 | Embodiment 7 | Embodiment 8 |
|---|---|---|---|---|
| $|f_2|F_W/(f_W Z)$ | 0.318 | 0.330 | 0.294 | 0.341 |
| $f_4/f_W$ | 2.04 | 1.95 | 1.99 | 2.26 |
| $F_W \Sigma \Delta_i / f_W$ | 0.0053 | 0.0158 | 0.0078 | 0.0083 |
| $\nu_{2-} - \nu_{2+}$ | 28.65 | 25.7 | 25.7 | 28.65 |
| $n_3 \sqrt{F_W}$ | 2.173 | 2.400 | 2.400 | 2.036 |

The meanings of the symbols shown in the table of the embodiments 9 to 13 indicated hereunder are as follows:

R: Radius of curvature of each refractive surface
D: Refractive surface interval
N: Refractive index of the lens material (wave length of d line: 587.56 nm)
V: Abbe number of the lens material
f: Focal length of the entire lens system
2ω: View angle
F: F number
$f_b$: Back focal length (Length from the image side of the cover glass to the image surface)
$\Sigma_D$: Length from the lens head to the image surface (The cover glass is included.)
Y: Image height Various values shown in the embodiments of this specification are given in a separate table. In the embodiments, a low-pass filter, an infrared absorption filter, and a glass cover equivalent to a face plate are mounted between the last lens surface and the image surface.

A concrete configuration of the embodiments comprises a first lens component comprising a cemented lens of a negative meniscus lens and a positive biconvex lens and a positive meniscus lens having a convex surface directed toward the object side sequentially from the object side, a second lens component comprising a negative meniscus lens and a cemented lens of a biconcave lens and a positive lens sequentially from the object side, a third lens component comprising a single lens having an aspheric surface and a weak refractive power and a positive single lens, a fourth lens component comprising a positive single lens and a cemented lens of a negative meniscus lens and a positive lens, and a 5th lens component comprising a single lens with a comparatively weak refractive power.

Embodiment 9
$f = 7.20 \sim 41.18 \quad F = 1.84 \sim 2.40$
$2\omega = 45.7 \sim 8.4° \quad Y = 3.03 \quad f_b = 2.05$

| No | | R | D | N | V |
|---|---|---|---|---|---|
| 1 | 1st lens component | 69.965 | 0.80 | 1.80518 | 25.4 |
| 2 | | 23.553 | 3.90 | 1.58913 | 61.2 |
| 3 | | −58.127 | 0.20 | | |
| 4 | | 17.970 | 2.60 | 1.62299 | 58.2 |
| 5 | | 44.820 | A | | |
| 6 | 2nd lens component | 24.851 | 0.65 | 1.71300 | 53.9 |
| 7 | | 7.816 | 2.50 | | |
| 8 | | −10.397 | 0.60 | 1.69680 | 55.5 |
| 9 | | 10.409 | 1.70 | 1.84666 | 23.8 |
| 10 | | 228.942 | B | | |

-continued

| | | | | | |
|---|---|---|---|---|---|
| 11 | ] | | 9.295 | 2.20 | 1.69680 | 55.5 |
| 12 | ] 3rd lens | 14.546 | 0.50 | | |
| 13 | ] component | 20.219 | 1.60 | 1.49200 | 57.0 |
| 14 | ] | 20.076 | C | | |
| 15 | ] | 29.002 | 1.80 | 1.77250 | 49.6 |
| 16 | ] 4th lens | −99.260 | 0.20 | | |
| 17 | ] component | 20.583 | 0.80 | 1.84666 | 23.8 |
| 18 | ] | 7.335 | 3.40 | 1.71300 | 53.9 |
| 19 | ] | −50.007 | D | | |
| 20 | ] 5th lens | −20.000 | 1.80 | 1.49200 | 57.0 |
| 21 | ] component | −17.360 | 1.70 | | |
| 22 | ] Cover glass | ∞ | 4.90 | 1.51633 | 64.1 |
| 23 | ] | ∞ | | | |

Component interval

| f | A | B | C | D |
|---|---|---|---|---|
| 7.20 | 0.70 | 17.20 | 4.84 | 4.41 |
| 17.60 | 8.97 | 8.93 | 3.39 | 5.86 |
| 41.18 | 15.47 | 2.43 | 7.34 | 1.91 |

| Component No. | Focal length of each component |
|---|---|
| 1 | $f_{1\sim 5} = 29.469$ |
| 2 | $f_{6\sim 10} = -7.949$ |
| 3 | $f_{11\sim 14} = 30.338$ |
| 4 | $f_{15\sim 19} = 14.570$ |
| 5 | $f_{20\sim 21} = 218.242$ | clear aperture radius of 14th aspheric surface = 4.14

Aspheric coefficient

14th aspheric surface
$K = 0.75126 \times 10$
$A_4 = 0.20172 \times 10^{-3}$
$A_6 = 0.10229 \times 10^{-5}$ 21st Aspheric surface
$K = 0.19266 \times 10$
$A_4 = 0.19815 \times 10^{-3}$
$A_6 = -0.24663 \times 10^{-5}$
$A_8 = -0.48691 \times 10^{-8}$ Embodiment 10

$f = 7.16\sim 41.17$   $F = 1.84\sim 2.40$
$2\omega = 45.9\sim 8.4$   $Y = 3.03$   $f_b = 2.05$

| No | | R | D | N | V |
|---|---|---|---|---|---|
| 1 | ] | 70.546 | 0.80 | 1.80518 | 25.4 |
| 2 | ] 1st lens | 23.641 | 3.90 | 1.58913 | 61.2 |
| 3 | ] component | −62.331 | 0.20 | | |
| 4 | ] | 18.073 | 2.60 | 1.62299 | 58.2 |
| 5 | ] | 48.524 | A | | |
| 6 | ] | 21.283 | 0.65 | 1.71300 | 53.9 |
| 7 | ] 2nd lens | 7.607 | 2.50 | | |
| 8 | ] component | −10.275 | 0.60 | 1.69680 | 55.5 |
| 9 | ] | 9.928 | 1.70 | 1.84666 | 23.8 |
| 10 | ] | 132.466 | B | | |
| 11 | ] | 9.797 | 2.20 | 1.69680 | 55.5 |
| 12 | ] 3rd lens | 11.442 | 0.50 | | |
| 13 | ] component | 13.259 | 1.60 | 1.49200 | 57.0 |
| 14 | ] | 24.915 | C | | |
| 15 | ] | 26.255 | 1.80 | 1.77250 | 49.6 |
| 16 | ] 4th lens | −57.961 | 0.20 | | |
| 17 | ] component | 24.983 | 0.80 | 1.84666 | 23.8 |
| 18 | ] | 7.796 | 3.40 | 1.71300 | 53.9 |
| 19 | ] | −65.123 | D | | |
| 20 | ] 5th lens | −20.689 | 1.80 | 1.49200 | 57.0 |
| 21 | ] component | −18.133 | 1.70 | | |
| 22 | ] Cover glass | ∞ | 4.90 | 1.51633 | 64.1 |
| 23 | ] | ∞ | | | |

Component interval

| f | A | B | C | D |
|---|---|---|---|---|
| 7.16 | 0.70 | 17.20 | 4.84 | 4.41 |
| 17.59 | 8.97 | 8.93 | 3.39 | 5.86 |
| 41.17 | 15.47 | 2.43 | 7.34 | 1.91 |

| Component No. | Focal length of each component |
|---|---|
| 1 | $f_{1\sim 5} = 29.446$ |
| 2 | $f_{6\sim 10} = -7.911$ |
| 3 | $f_{11\sim 14} = 30.762$ |
| 4 | $f_{15\sim 19} = 14.727$ |
| 5 | $f_{20\sim 21} = 242.063$ | clear aperture radius of 14th aspheric surface = 4.19

Aspheric coefficient

14th aspheric surface
$K = 0.94047 \times 10$
$A_4 = 0.18717 \times 10^{-3}$
$A_6 = 0.11352 \times 10^{-5}$ 21st aspheric surface
$K = 0.16627 \times 10$
$A_4 = 0.20017 \times 10^{-3}$
$A_6 = -0.24691 \times 10^{-5}$
$A_8 = -0.48691 \times 10^{-8}$ Embodiment 11

$f = 7.20\sim 41.68$   $F = 1.84\sim 2.40$
$2\omega = 45.6\sim 8.3$   $Y = 3.03$   $f_b = 2.12$

| No | | R | D | N | V |
|---|---|---|---|---|---|
| 1 | ] | 81.285 | 0.80 | 1.80518 | 25.4 |
| 2 | ] 1st lens | 23.074 | 3.90 | 1.58913 | 61.2 |
| 3 | ] component | −65.224 | 0.20 | | |
| 4 | ] | 18.874 | 2.60 | 1.62299 | 58.2 |
| 5 | ] | 83.931 | A | | |
| 6 | ] | 113.224 | 0.65 | 1.71300 | 53.9 |
| 7 | ] 2nd lens | 7.922 | 2.50 | | |
| 8 | ] component | −10.842 | 0.60 | 1.69680 | 55.5 |
| 9 | ] | 11.737 | 1.70 | 1.84666 | 23.8 |
| 10 | ] | −61.554 | B | | |
| 11 | ] | 9.543 | 2.20 | 1.69680 | 55.5 |
| 12 | ] 3rd lens | 18.990 | 0.50 | | |
| 13 | ] component | 105.609 | 1.60 | 1.49200 | 57.0 |
| 14 | ] | 26.429 | C | | |
| 15 | ] | 26.998 | 1.80 | 1.77250 | 49.6 |
| 16 | ] 4th lens | −32.348 | 0.20 | | |
| 17 | ] component | 20.766 | 0.80 | 1.84666 | 23.8 |
| 18 | ] | 7.019 | 3.40 | 1.71300 | 53.9 |
| 19 | ] | 7196.298 | D | | |
| 20 | ] 5th lens | −17.539 | 1.80 | 1.49200 | 57.0 |
| 21 | ] component | −27.265 | 1.69 | | |
| 22 | ] Cover glass | ∞ | 4.90 | 1.51633 | 64.1 |
| 23 | ] | ∞ | | | |

Component interval

| f | A | B | C | D |
|---|---|---|---|---|
| 7.20 | 0.70 | 17.20 | 4.84 | 4.41 |
| 17.63 | 8.97 | 8.93 | 3.39 | 5.86 |
| 41.68 | 15.47 | 2.43 | 7.34 | 1.91 |

| Component No. | Focal length of each component |
|---|---|
| 1 | $f_{1\sim 5} = 28.206$ |
| 2 | $f_{6\sim 10} = -7.957$ |
| 3 | $f_{11\sim 14} = 35.319$ |
| 4 | $f_{15\sim 19} = -13.634$ |

$f_{20\sim 21} = -106.436$ clear aperture radius of 14th aspheric surface = 4.48

Aspheric coefficient

14th aspheric surface
$K = 0.11381 \times 10^2$
$A_4 = 0.23706 \times 10^{-3}$
$A_6 = 0.10552 \times 10^{-5}$ 21st aspheric surface
$K = 0.57621 \times 10$
$A_4 = 0.15310 \times 10^{-3}$
$A_6 = -0.23720 \times 10^{-5}$
$A_8 = -0.48691 \times 10^{-8}$ Embodiment 12

$f = 7.20\sim 41.12$   $F = 1.84\sim 2.40$
$2\omega = 45.6\sim 8.4$   $Y = 3.03$   $f_b = 2.05$

| No | | R | D | N | V |
|---|---|---|---|---|---|
| 1 | ] | 63.888 | 0.80 | 1.80518 | 25.4 |
| 2 | ] 1st lens | 23.090 | 3.90 | 1.58913 | 61.2 |
| 3 | ] component | −59.729 | 0.20 | | |
| 4 | ] | 17.243 | 2.60 | 1.62299 | 58.2 |
| 5 | ] | 37.681 | A | | |
| 6 | ] | 21.287 | 0.65 | 1.71300 | 53.9 |
| 7 | ] 2nd lens | 7.613 | 2.50 | | |
| 8 | ] component | −10.358 | 0.60 | 1.69680 | 55.5 |
| 9 | ] | 10.065 | 1.70 | 1.84666 | 23.8 |
| 10 | ] | 133.379 | B | | |
| 11 | ] | 10.049 | 2.20 | 1.69680 | 55.5 |
| 12 | ] 3rd lens | 17.081 | 0.50 | | |
| 13 | ] component | 21.700 | 1.60 | 1.49200 | 57.0 |
| 14 | ] | 22.813 | C | | |
| 15 | ] | 30.130 | 1.80 | 1.77250 | 49.6 |
| 16 | ] 4th lens | −35.941 | 0.20 | | |
| 17 | ] component | 25.325 | 0.80 | 1.84666 | 23.8 |
| 18 | ] | 7.607 | 3.40 | 1.71300 | 53.9 |

-continued

| No | | R | D | N | V |
|---|---|---|---|---|---|
| 19 | | −134.570 | D | | |
| 20 | 5th lens | −7.136 | 1.80 | 1.49200 | 57.0 |
| 21 | component | −6.403 | 1.70 | | |
| 22 | Cover glass | ∞ | 4.90 | 1.51633 | 64.1 |
| 23 | | ∞ | | | |

Component interval

| f | A | B | C | D |
|---|---|---|---|---|
| 7.20 | 0.70 | 17.20 | 4.84 | 4.41 |
| 17.62 | 8.97 | 8.93 | 3.39 | 5.86 |
| 41.12 | 15.47 | 2.43 | 7.34 | 1.91 |

| Component No. | Focal length of each component |
|---|---|
| 1 | $f_{1 \sim 5} = 29.770$ |
| 2 | $f_{6 \sim 10} = -7.943$ |
| 3 | $f_{11 \sim 14} = 29.053$ |
| 4 | $f_{15 \sim 19} = 14.982$ |
| 5 | $f_{20 \sim 21} = 69.994$ | clear aperture radius of 14th aspheric surface = 4.12

Aspheric coefficient

| 14th aspheric surface | $K = 0.82075 \times 10$ |
| | $A_4 = 0.20181 \times 10^{-3}$ |
| | $A_6 = 0.10027 \times 10^{-5}$ |
| 21st aspheric surface | $K = -0.49388$ |
| | $A_4 = 0.13384 \times 10^{-3}$ |
| | $A_6 = -0.25956 \times 10^{-5}$ |
| | $A_8 = -0.48691 \times 10^{-8}$ |

Embodiment 13

$f = 6.70 \sim 51.17$  $F = 1.84 \sim 2.88$
$2\omega = 48.7 \sim 6.8$  $Y = 3.03$  $f_b = 2.00$

| No | | R | D | N | V |
|---|---|---|---|---|---|
| 1 | | 53.794 | 0.80 | 1.80518 | 25.4 |
| 2 | | 23.147 | 4.10 | 1.51633 | 64.1 |
| 3 | 1st lens component | −52.204 | 0.20 | | |
| 4 | | 17.888 | 2.55 | 1.62299 | 58.2 |
| 5 | | 39.611 | A | | |
| 6 | | 32.209 | 0.65 | 1.77250 | 49.6 |
| 7 | 2nd lens | 8.204 | 2.80 | | |
| 8 | component | −9.802 | 0.60 | 1.71300 | 53.9 |
| 9 | | 9.802 | 1.80 | 1.84666 | 23.8 |
| 10 | | −384.439 | B | | |
| 11 | | 12.997 | 1.60 | 1.49200 | 57.0 |
| 12 | 3rd lens | 12.441 | 0.60 | | |
| 13 | component | 16.500 | 1.90 | 1.69680 | 55.5 |
| 14 | | 52.179 | C | | |
| 15 | | −189.706 | 1.90 | 1.77250 | 49.6 |
| 16 | | −18.112 | 0.20 | | |
| 17 | 4th lens component | 18.618 | 3.10 | 1.69680 | 55.5 |
| 18 | | −13.548 | 0.80 | 1.80518 | 25.4 |
| 19 | | 45.987 | D | | |
| 20 | 5th lens | −20.000 | 1.80 | 1.49200 | 57.0 |
| 21 | component | −14.395 | 3.50 | | |
| 22 | Cover glass | ∞ | 4.90 | 1.51633 | 64.1 |
| 23 | | ∞ | | | |

Group interval

| f | A | B | C | D |
|---|---|---|---|---|
| 6.70 | 0.70 | 19.40 | 6.73 | 5.87 |
| 18.22 | 9.88 | 10.22 | 3.75 | 8.85 |
| 51.17 | 17.70 | 2.40 | 9.85 | 2.75 |

| Component No. | Focal length of each component |
|---|---|
| 1 | $f_{1 \sim 5} = 30.987$ |
| 2 | $f_{6 \sim 10} = -7.373$ |
| 3 | $f_{11 \sim 14} = 35.429$ |
| 4 | $f_{15 \sim 19} = 18.273$ |
| 5 | $f_{20 \sim 21} = 94.408$ | clear aperture radius of 11th aspheric surface 4.99

Aspheric coefficient

| 11th aspheric surface | $K = -0.33358 \times 10$ |
| | $A_4 = 0.65702 \times 10^{-4}$ |
| 21st aspheric surface | $K = -0.44664 \times 10$ |
| | $A_4 = -0.10191 \times 10^{-4}$ |
| | $A_6 = -0.10643 \times 10^{-7}$ |

Numerical values of the above embodiments

| | Embodiment 9 | Embodiment 10 | Embodiment 11 | Embodiment 12 | Embodiment 13 |
|---|---|---|---|---|---|
| Z | 5.72 | 5.75 | 5.79 | 5.71 | 7.64 |
| ΣD | 61.05 | 61.05 | 61.11 | 61.05 | 68.50 |
| $\|f_2\|F_W/(f_WZ)$ | 0.32 | 0.35 | 0.35 | 0.36 | 0.27 |
| $f_W/f_{3A}$ | 0.00 | 0.13 | −0.10 | 0.01 | 0.00 |
| $F_W\Delta_3/f_W$ | 0.03 | 0.02 | 0.04 | 0.02 | 0.0 |
| $f_W/f_4$ | 0.49 | 0.49 | 0.53 | 0.48 | 0.37 |
| $f_W/f_5$ | 0.03 | 0.03 | −0.07 | 0.10 | 0.07 |

As described above, the zoom lens apparatus of the present invention does not require a conventional position detection means for each lens component and positions the variable magnification lens component and the focusing lens component actively from the calculation control unit, providing a high speed and precise operation and a low price.

Furthermore, the zoom lens apparatus of the present invention is most suitable particularly to video cameras because as shown in the embodiments and aberration drawings, although the variable magnification ratio is as high as about 6 and the brightness is high, the F-number is 1.4 to 2.0, the number of lenses constituting the lens system is small, the entire length and the diameter of the front lens are small, and the aberration correction are well-balanced.

What is claimed is:

1. A zoom lens apparatus comprising:
   (a) a first lens component having a positive refractive power, said first lens component being provided at a fixed position at a side of the apparatus nearest to an object to be photographed;
   (b) a second lens component having a negative refractive power, said second lens component being movable for variation of image magnification and being provided next to said first lens component;
   (c) a third lens component having a positive refractive power, said third lens component being provided at a fixed position next to said second lens component;
   (d) a fourth lens component having a positive refractive power for compensating a shift of focus resulting from the variation of the image magnification, said fourth lens component being provided next to said third lens component; and
   (e) a fifth lens component, said fifth lens component being provided at a fixed position between said fourth lens component and a side of the apparatus nearest the image to be formed, said fifth lens component having a relatively weak refractive power; and further
   wherein an aspheric element is included in at least one of said fourth lens component and said fifth lens component.

2. The apparatus of claim 1, wherein
   said first lens component includes a positive refractive power lens and a negative refractive power lens;
   said second lens component includes at least two negative refractive power lenses and a positive refractive power lens;
   said third lens component includes a positive refractive power lens;
   said fourth lens component includes a positive refractive power lens and a negative refractive power lens; and said fifth lens component includes a positive refractive power lens; and wherein the following formulas are satisfied:

$$0.25 < |f_2|F_w / (f_w \cdot Z) < 0.4$$

and $$1.8 < f_4 / f_w < 2.5$$

in which
$f_2$ represents the resultant focal length of said second lens component,
$f_4$ represents the resultant focal length of said fourth lens component,
$f_w$ represents the focal length at the wide angle end of the entire lens system,
$F_w$ represents the F-number at the wide angle end of the entire lens system, and
Z represents the magnification ratio.

3. The apparatus of claim 2, wherein:
(a) said first lens component comprises, from the object side, a positive doublet, having a negative meniscus lens and a biconvex lens, and a positive meniscus lens, having a convex surface directed toward the object side, the negative refractive power lens of said first lens component being the negative meniscus lens of said positive doublet, and the positive refractive power lens of said first lens component being one of either the biconvex lens of said positive doublet and the positive meniscus lens;
(b) said second lens component comprises, from the object side, a negative lens, having the surface with greater curvature directed toward the image side, and a negative doublet, having a biconcave lens and a positive lens, the at least two negative refractive power lenses of said second lens component being the biconcave lens of said negative doublet and the negative lens, and the positive refractive power lens of said second lens component being the positive lens of said negative doublet;
(c) the positive refractive power lens of said third lens component being one of either a positive lens and a positive doublet, having a positive lens and a negative meniscus lens;
(d) the negative refractive power lens and the positive refractive power lens of said fourth lens component being, in order from the object side, a negative lens having a surface with the greater curvature directed toward the image side and a positive lens;
(e) the positive refractive power lens of said fifth lens component being a positive single lens having a relatively wear refractive power; and
further wherein the following formulas are satisfied:

$$n_{2-} > 1.6;$$
$$\nu_{2-} - \nu_{2+} > 20;$$
$$\text{and } n_3 \cdot \sqrt{F_w} > 1.8$$

in which
$n_{2-}$ represents the average value of the refractive index for the negative lenses in said second lens component,
$\nu_{2-}$ represents the average value of the Abbe number of the negative lenses in said second lens component,
$\nu_{2+}$ represents the Abbe number for the positive lens in said second lens component,
$n_3$ represents the refractive index for the positive lens in said third lens component, and
$F_w$ represents the F-number at the wide angle end of the entire lens system.

4. The apparatus of claim 1, wherein
said first lens component is composed, in order from the object side, of a positive doublet including a negative meniscus lens and a biconvex lens, and a positive meniscus lens having a convex surface directed toward the object; said second lens component is composed, in order from the object side, of a negative lens having the surface with the greater curvature directed toward the image and a negative doublet including a biconcave lens and a positive lens; said third lens component is composed of either a positive lens or a positive doublet including a positive lens and a negative meniscus lens;
said fourth lens component is composed, in order from the object side, of a negative lens having the surface with the greater curvature directed toward the image and a positive lens; and
said fifth lens component is composed of a positive single lens having a relatively weak refractive power; wherein the following formulas are satisfied:

$$n_{2-} > 1.6;$$
$$\nu_{2-} - \nu_{2+} > 20;$$
$$\text{and } n_3 \cdot \sqrt{F_w} > 1.8$$

in which
$n_{2-}$ represents the average value of the refractive index for said negative lenses in said second lens component,
$\nu_{2-}$ represents the average value of the Abbe number of said negative lenses in said second lens component,
$\nu_{2+}$ represents the Abbe number for said positive lens in said second lens component, and
$n_3$ represents the refractive index for said positive lens in said third lens component.

5. The apparatus of claim 1, wherein said fifth lens component has a relatively weak positive refractive power.

6. The apparatus of claim 1, wherein said third lens component includes a single lens having an aspheric element with a relatively weak refractive power and a positive single lens.

7. A zoom lens apparatus comprising:
(a) a first lens component having a negative lens and a positive lens, said first lens component being provided at a fixed position at a side of the apparatus nearest to an object to be photographed;
(b) a second lens component having a negative lens, said second lens component being movable for variation of image magnification and being provided next to said first lens component;
(c) a third lens component being composed of a single lens having an asphere with a relatively weak refractive power and a positive single lens, said third lens component being provided at a fixed position next to said second lens component, wherein the following formulas are satisfied for said single lens having the asphere:

$$-0.18 < f_w / f_{3A} < 0.18$$

and $$0.001 < F_w \Delta_3 / f_w < 0.1$$

in which $f_w$ represents the focal length of the entire lens system at the wide angle end, $f_{3A}$ represents the focal length of said single lens having anasphere of said third lens component, $F_w$ represents the F-number at the wide angle end of the entire lens system, and $\Delta_{32}$ represents the deformation value from a master sphere at the clear aperture radius position of the asphere of said third lens component, the radius of curvature of said master sphere being equal to the radius of axial curvature of the asphere;

(d) a fourth lens component having a positive refractive power, said fourth lens component compensating a shift of focus resulting from the variation of the image magnification and being provided next to said third lens component; and (e) a fifth lens component being composed of a single lens having a relatively weak refractive power, said fifth lens component being provided at a fixed position next to said fourth lens component.

8. The apparatus of claim 7, wherein the single lens of said fifth lens component is a positive single lens.

9. The apparatus of claim 7, wherein the single lens of said fifth lens component is a negative single lens.

* * * * *

UNITED STATES PATENT AND TRADEMARK OFFICE
CERTIFICATE OF CORRECTION

PATENT NO. : 5,202,992
DATED : April 13, 1993
INVENTOR(S) : Banno et al.

It is certified that error appears in the above-identified patent and that said Letters Patent is hereby corrected as shown below:

Claim 3, column 25, line 54, change "wear" to --weak--;

Claim 4, column 26, line 27, after "power;" insert --and--;

Claim 7, column 27, line 10, change "anasphere" to --an asphere--; and

Claim 7, column 27, line 14, change "$\Delta_{32}$" to --$\Delta_3$--.

Signed and Sealed this

Twenty-first Day of June, 1994

Attest:

BRUCE LEHMAN

*Attesting Officer*     Commissioner of Patents and Trademarks